(12) United States Patent
Basu et al.

(10) Patent No.: US 6,269,334 B1
(45) Date of Patent: Jul. 31, 2001

(54) NONGAUSSIAN DENSITY ESTIMATION FOR THE CLASSIFICATION OF ACOUSTIC FEATURE VECTORS IN SPEECH RECOGNITION

(75) Inventors: Sankar Basu, Tenafly, NJ (US); Charles A. Micchelli, Mogehan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/104,553

(22) Filed: Jun. 25, 1998

(51) Int. Cl.$^7$ .................................................. G10L 13/00
(52) U.S. Cl. ......................................... 704/256; 704/255
(58) Field of Search ..................................... 904/231, 255, 904/240, 256; 704/231, 255, 256, 240

(56) References Cited

U.S. PATENT DOCUMENTS

| | | | |
|---|---|---|---|
| 4,783,804 | * 11/1988 | Juang et al. | 381/43 |
| 5,148,489 | * 9/1992 | Erell et al. | 381/47 |
| 5,271,088 | * 12/1993 | Bahler | 395/2 |
| 5,473,728 | * 12/1995 | Luginbuhl et al. | 395/25.2 |
| 5,694,342 | * 12/1997 | Stein | 364/572 |
| 5,706,402 | * 1/1998 | Bell | 395/23 |
| 5,737,490 | * 4/1998 | Austin et al. | 395/2.65 |
| 5,754,681 | * 5/1998 | Watanabe et al. | 382/159 |
| 5,790,758 | * 8/1998 | Streit | 706/33 |
| 5,839,105 | * 11/1998 | Ostendorf et al. | 704/256 |
| 5,857,169 | * 1/1999 | Seide | 704/256 |
| 5,864,810 | * 1/1999 | Digalakis et al. | 704/255 |

OTHER PUBLICATIONS

Godsill et al, "Robust Noise Reduction For Speech and Audio Signals", IEEE, pp. 625–628, 1996.*

Laskey, "A Bayesian Approach to Clustering and Classification", IEEE pp. 179–183, 1991.*

Tugnait, "Parameter Identifiability of Multichannel ARMA Models of Linear Non–Gaussian Signals Via cumulant Matching", IEEE, IV 441–444, 1994.*

Frangoulis, "Vector Quantization of the Continuous Distributions of an HMM Speech Recogniser base on Mixtures of Continuous Distributions", IEEE, pp. 9–12, 1989.*

Pham et al, "Maximum Likelihood Estimation of a Class of Non–Gaussian Densities with Application to Lp Deconvolution", IEEE transactions on Acoustics, Speech, and Signal Processing, vol. 37, #1, Jan. 1989.*

Basu et al, "Maximum Likelihood Estimates for Exponential Type Density Families", Acoustics, Speech, and Signal Processing, Mar. 1999.*

Beadle et al, "Parameter Estimation for Non–Gaussian Autoregressive Processes", IEEE, pp. 3557–3560, 1997.*

Young et al, "The HTK Book", pp. 3–44, Entropic Cambridge Research Laboratory, Dec. 1997.*

Kuruoglu et al, "Nonlinear Autoregressive Modeling of Non–Gaussian Signals Using Lp Norm Techniques", IEEE, pp. 3533–3536, 1997.*

Zhuang et al, "Gaussian Mixture Density Modeling, Decomposition, and Applications", IEEE Transactions on Image Processing, vol. 5, #9, pp. 1293–1302, Sep. 1996.*

* cited by examiner

*Primary Examiner*—Krista Zele
*Assistant Examiner*—Michael N. Opsasneck
(74) *Attorney, Agent, or Firm*—Whitham, Curtis & Whitham; Stephen C. Kaufman, Esq.

(57) ABSTRACT

A statistical modeling paradigm for automatic machine recognition of speech uses mixtures of nongaussion statistical probability densities which provides improved recognition accuracy. Speech is modeled by building probability densities from functions of the form $\exp(-t^{\alpha/2})$ for $t \geq 0$ and $\alpha > 0$. Mixture components are constructed from different univariate functions. The mixture model is used in a maximum likelihood model of speech data.

8 Claims, 9 Drawing Sheets

NONGAUSSIAN DENSITY ESTIMATION FOR THE CLASSIFICATION OF ACOUSTIC FEATURE VECTORS IN SPEECH RECOGNITION

BACKGROUND OF THE INVENTION

1. Field of the Invention

The present invention generally relates to speech recognition systems and, more particularly, to the use of EM type algorithms for the estimation of parameters for a mixture model of nongaussian densities. The present invention was motivated by two objectives. The first was to study maximum likelihood density estimation methods for high dimensional data, and the second was the application of the techniques developed in large vocabulary continuous parameter speech recognition.

2. Background Description

Speech recognition systems requires modeling the probability density of feature vectors in the acoustic space of phonetic units. Purely gaussian densities have been know to be inadequate for this purpose due to the heavy tailed distributions observed by speech feature vectors. Se,, for example, Frederick Jelenik, *Statistical Methods for Speech Recognition*, MIT Press, 1997. As an intended remedy to this problem, practically all speech recognition systems attempt modeling by using a mixture model with gaussian densities for mixture components. Variants of the standard K-mean clustering algorithm are used for this purpose. The classical version (as described by John Hartigan in *Clustering Algorithms*, John Wiley & Sonse, 1975, and Anil Jain and Richard Dubes in *Algorithms for Clustering Data*, Prentice Hall, 1988) of the K-means algorithm can also be viewed as an special case of the EM algorithm (as described by A. P. Dempster, N. M. Laird and D. B. Baum in "Maximum likelihood from incomplete data via the EM algorithm", *Journal of Royal Statistical Soc.*, Ser. B, vol. 39, pp. 1–38, 1997) in the limiting case of gaussian density estimation with variance zero. See, for example, Christopher M. Bishop, *Neutral Networks for Pattern Recognition*, Cambridge University Press, 1997, and F. Marroquin and J. Girosi, "Some extensions of the K-means algorithm for image segmentation and pattern classification", *MIT Artificial Intelligence Lab. A. I. Memorandum no.* 1390, January 1993. The only known attempt to model the phonetic units in speech with nongaussian mixture densities is described by H. Ney and A. Noll in "Phoneme modeling using continuous mixture densities", *Proceedings of IEEE Int. Conf. on Acoustics Speech and Signal Processing*, pp. 437–440, 1988, where laplacian densities were used in a heuristic based estimation algorithm.

SUMMARY OF THE INVENTION

It is therefore an object of this invention to provide a new statistical modeling paradigm for automatic machine recognition of speech.

According to this invention, novel mixtures of nongaussian statistical probability densities for modeling speech subword units (e.g., phonemes) and further subcategories thereof, including the transition and output probabilities, are used in a Hidden Markov generative model of speech. We model speech data by building probability densities from functions of the form $\exp(-t^{\alpha/2})$ for $t \geq 0$, $\alpha > 0$. In this notation, the case $\alpha=2$ corresponds to the gaussian density, whereas the laplacian case considered in Ney et al. corresponds to $\alpha=1$.

Furthermore, we focus on a set of four different types of mixture components constructed from a different univariate function. For each of them, a mixture model is then used for a maximum likelihood model of speech data. It turns out that our iterative algorithm can be used for a range of values of $\alpha$ (opposed to fixed $\alpha=1$ in Ney et al. or $\alpha=2$ in standard speech recognition systems).

Our observation is that the distribution of speech feature vectors in the acoustic space are better modeled by mixture models with nongaussian mixture components. In particular, for speech $\alpha<1$ seems more appropriate, see FIG. 1. To wit, very similar distributions have been noted for the distribution of image gradients by Stuart Geman in "Three lectures on image understanding", The Center For Imaging Science, Washington State University, video tabe, Sep. 10–12, 1997, and also by David Mumford in pattern theory, Lecture in Directors Series, IBM Yorktown Heights, Feb. 23, 1998.

The second point to be made is that from a practical standpoint estimation of densities in speech data is accomplished by all the difficulties characteristic of high dimensional density estimation problems. See David W. Scott, *Multivariate Density Extimation*, Wiley Interscience, 1992, and James R. Thompson and Richard A. Tapia, *Nonparametric Function Estimation*, modeling and simulation, SIAM Publications, 1997. Feature vectors of dimension fifty or more are typical in speech recognition systems, and consequently, the data can be considered to be highly sparse. In contrast, the literature (see Scott, supra) on multivariate density estimation puts high emphasis on "exploratory data analysis" the goal of which is to glean insight about the densities via visualization of the data. This is not feasible for dimensions of the order of fifty or more, even when projections on lower dimensional spaces are considered.

The classification/training step for speech recognition which we use can be cast in a general framework. We begin with a parametric family $p(x/\lambda)$, $x \in R^d$, $\lambda \in \Omega \subset R^q$ of probability densities on $R^d$ with parameters in the manifold $\Omega$ in $R^q$. The method of classification used here begins with k finite subsets of $T_1, T_2, \ldots, T_k$ of $R^d$ and consider the problem of deciding which of these sets given vector $x \in R^d$ lies. The method that we employ picks k probability densities $p_1 = p(.|\theta_1), \ldots, p_k = p(.|\theta_k)$ from our family and associates with the subset $T_l$ the probability density $p_1$, $l=1, 2, \ldots, k$. Then, we say $x \in R^d$ belongs to the subset $T_r$ if r is the least integer in the set $\{1, 2, \ldots, k\}$ such that $$p_r(x) \geq \max\{p_l(x): 1 \leq l \leq k\}.$$

To use this method we need to solve the problem of determining, for a given finite subset $T \subset R^d$, a probability density $p(.|\theta)$ in our family. This is accomplished by maximum likelihood estimation (MLE). Thus, the likelihood function, for the data T is given by $$L(\lambda \mid T) = \prod_{y \in T} p(y \mid \lambda), \quad \lambda \in \Omega,$$

and a vector, $\theta \in \Omega$, is chosen which maximizes this function over all $\lambda \in \Omega$ (if possible). Generally, a maximum does not exist, (see V. N. Vapnik, *The Nature of Statistical Learning Theory*, Springer Verlag, 1995, p. 24), and thus, typically as iterative method is used to find a stationary point of the likelihood function. As we shall see, the iteration we use takes the form of a variation of the EM algorithm described by Dempster et al., supra, and Richard A. Redner and Homer Walker, "Mixture densities, maximum likelihood and the EM algorithm", SIAM Review vol. 26, no. 2, April 1984.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
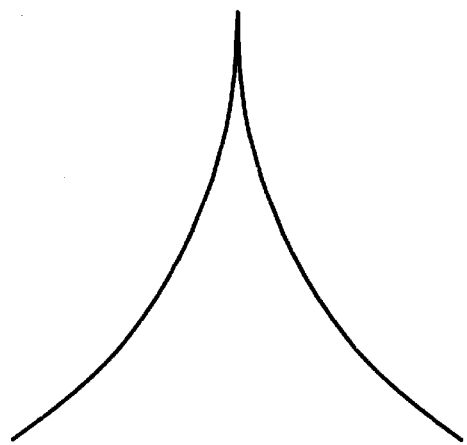
FIG. 1 is a graph showing an optimum mixture component in logarithmic scale.

We begin with a nonnegative function f defined on the positive real axis $R_+$ such that all of its moments $$m_\beta = \int_{R_+} t^\beta f(t) dt, \tag{1}$$

are finite for $\beta \geq -\frac{1}{2}$. Here, $R_+$ denotes the positive real axis. We also use $PD^d$ to denote the space of all positive definite matrices of size d.

Lemma 1 We define constants $$\rho_d = \frac{\Gamma\left(\frac{d}{2}\right)}{\pi^{\frac{d}{2}}} \frac{\left(m_{\frac{d}{2}}\right)^{\frac{d}{2}}}{\left(m_{\frac{d}{2}-1}\right)^{\frac{d}{2}+1}}$$

and $$\gamma_d = \frac{m_{\frac{d}{2}}}{m_{\frac{d}{2}-1}}.$$

Then for any vector $\mu$ in $R^d$ and any positive definite matrix $\Sigma$ of size d, the function $$p(x | \mu, \Sigma) = \rho_d \frac{1}{\sqrt{\det \Sigma}} f(\gamma_d(x-\mu)^t \Sigma^{-1}(x-\mu)), \quad x \in R^d \tag{2}$$

is a probability density function with mean $\mu$ and covariance $\Sigma$.

Proof: The proof uses the following identity which holds for any non-negative integer k and positive constant $\delta$ $$\int_{R^d} \|x\|^k f(\delta \|x\|^2) dx = \frac{\pi^{\frac{d}{2}}}{\Gamma\left(\frac{d}{2}\right)} \delta^{-\frac{k+d}{2}} m_{\frac{k+d-2}{2}},$$

where $$\|x\|^2 = \sum_{i=1}^{d} x_i^2, \quad x = (x_1, x_2, \ldots, x_d).$$

the verification of this equation uses the fact that volume of the surface of unit sphere in $R^d$ is $$\frac{2\pi^{\frac{d}{2}}}{\Gamma\left(\frac{d}{2}\right)}.$$

Additionally, we may combine the method of tensor product with this lemma and construct other densities which we shall employ later. The proof of the next lemma is even simpler than the one above.

Lemma 2 Let $x=(x^1, x^2)$, where $x^i \in R^{d_i}$, i=1,2. Suppose $p_i(x^i|\Sigma^i, \mu^i)$, $x^i \in R^{d_i}$; i=1,2 have the form (2) above. Then $$p((x^1, x^2)|\mu, \Sigma) = p_1(x^1|\mu^1, \Sigma^1) p_2(x^2|\mu^2, \Sigma^2),$$

$$x^1 \in R^{d_1}, x^2 \in R^{d_2}$$

has mean $\mu=(\mu^1, \mu^2)$ and covariance $$\Sigma = \begin{pmatrix} \Sigma^1 & 0 \\ 0 & \Sigma^2 \end{pmatrix}.$$

A special case of this construction is the density $$p(x|\mu, \sigma) = \rho_1^d \frac{1}{\sqrt{\prod_{i=1}^{d} \sigma_i}} \prod_{i=1}^{d} f\left(\gamma_1 \frac{(x_i - \mu_i)^2}{\sigma_i}\right)$$

defined for $x=(x_1, x_2, \ldots, x_d) \in R^d$, where $\mu=(\mu_1, \mu_2, \ldots, \mu_d)$ and $\sigma=(\sigma_1, \sigma_2, \ldots, \sigma_d)$ are the mean and diagonal covariance, respectively.

Let us note some special cases.

EXAMPLE 1

For this example, we choose any $\alpha \in R_+$, define the function $$f(t) = \exp(-t^{\alpha/2}), \quad t \in R_+ \tag{3}$$

and note for $\beta > -1$ that $$m_\beta = 2\alpha^{-1} \Gamma\left(\frac{2\beta + 2}{\alpha}\right). \tag{4}$$

Consequently, the function $$S_\beta(x|\mu, \Sigma) = \frac{\rho_d(\alpha)}{\sqrt{\det\Sigma}} \exp\left(-(\gamma_d(\alpha)(x-\mu))^{\frac{\alpha}{2}}\right), \quad x \in R^d \quad (5)$$

where $$\rho_d(\alpha) = \frac{\alpha}{2} \frac{\Gamma\left(\frac{d}{2}\right) \Gamma\left(\frac{d+2}{\alpha}\right)^{\frac{d}{2}}}{\pi^{\frac{d}{2}} \Gamma\left(\frac{d}{\alpha}\right)^{\frac{d}{2}+1}}$$

and $$\gamma_d(\alpha) = \frac{\Gamma\left(\frac{d+2}{\alpha}\right)}{\Gamma\left(\frac{d}{\alpha}\right)}$$

is a probability density with mean $\mu$ and covariance $\Sigma$ for any $\alpha>0$. We refer to this as a spherical $\alpha$-density.

EXAMPLE 2

As a special case of this construction, we choose $d=1$ and consider the univariate density We use this univariate density and construct a multivariate density by the formula
where $x=(x_1, x_2, \ldots, x_d) \in R^d$. We refer to this as a tensor product $\alpha$-

$$\frac{1}{\sqrt{\sigma}} \rho_1(\alpha) \exp\left(-\gamma_1(\alpha)\left(\frac{(t-\mu)^\alpha}{\sigma}\right)\right), \quad t \in R. \quad (6)$$

$$T_\alpha(x|\mu, \sigma) = \frac{1}{\sqrt{\det\operatorname{diag}\sigma}} \rho_1(\alpha)^d \exp\left(-\gamma_1(\alpha)^{\frac{\alpha}{2}} \sum_{l=1}^d \sigma_l^{-\alpha/2} |x_l - \mu_l|^\alpha\right),$$

density.

It is interesting to note the limiting form of these distributions when $\alpha \to \infty$. (We refer to K. Fukunaga, *Statistical Pattern Recognition*, second edition, Academic Press, 1990, for a related discussion). Since $\lim_{x \to 0} x\Gamma(x) = 1$, we conclude that $$\lim_{\alpha \to \infty} \gamma_d(\alpha) = \frac{d}{d+2}$$

and also $$\lim_{\alpha \to \infty} \rho_d(\alpha) \left\{\frac{d}{(d+2)\pi}\right\}^{\frac{d}{2}} \Gamma\left(\frac{d}{2}+1\right).$$

Hence, we obtain for almost all $x \in R^d$ that $$\lim_{\alpha \to \infty} S_\alpha(x|\mu, \Sigma) = S_\infty(x|\mu, \Sigma)$$

where $$S_\infty(x|\mu, \Sigma) := \frac{1}{\sqrt{\det\Sigma}} f_\infty((x-\mu)^t \Sigma^{-1}(x-\mu)), \quad x \in R^d$$

and for $t \in R$ $$f_\infty(t) := \left\{\frac{d}{(d+2)\pi}\right\}^{d/2} \Gamma\left(\frac{d+2}{2}\right) \begin{cases} 1, & |t| < \frac{d=2}{2} \\ 0, & \text{otherwise} \end{cases}$$

Similarly, for the tensor product construction, we have for any $x \in R^d$ that $$\lim_{\alpha \to \infty} T_\alpha(x|\mu, \sigma) = \frac{1}{\sqrt{\prod_{i=1}^d \sigma_i}} g_\infty(\|(x-\mu)/\sqrt{\sigma}\|_\infty)$$

where $$\|(x-\mu)/\sqrt{\sigma}\|_\infty = \max_{1 \le l \le d} |x_l - \mu_l|/\sqrt{\sigma_l}$$

and for $t \in R$ $$g_\infty(t) = \frac{1}{3^{d/2}} \begin{cases} 1, & |t| \le \sqrt{3} \\ 0, & \text{otherwise} \end{cases}$$

The behavior of $S_\alpha$ and $T_\alpha$ where $\alpha \to 0^+$ are equally interesting. Both approach a "delta" function concentrated at their mean. The precise result we record for the spherical case states that $$\lim_{\alpha \to 0^+} \int_{R_d} f(x) S_\alpha(x|\mu, \Sigma) = f(\mu) \quad (7)$$

whenever f is continuous on the $R^d$ with the property that there exist constants $M, N > 0$ and $\beta \in [0, 2]$, such that for $\|x\| > N$ $$|f(x)| \le M\|x\|^\beta.$$

Observe that the value $\beta = 2$ must be excluded since for the function $$f(x) = (x-\mu)^t \Sigma^{-1}(x-\mu), \quad x \in R^d$$

the left hand side of equation (7) is one, while the right hand side is zero. The verification of equation (7) follows from a computation of all the moments of $S_\alpha$. Specifically, we have the following fact.

Lemma 3 For any $\beta \in (0, 2)$ and $\alpha \in R_+$, there exist $M, N > 0$ and $\gamma \in (0, 1)$ such that $$\int_{R_d} ((x-\mu)^t \Sigma^{-1}(x-\mu))^{\beta/2} S_\alpha(x|\mu, \Sigma) dx \le M\lambda^{1/\alpha}$$

whenever $0 < \alpha < N$.

Proof: We proceed as in Lemma 1 and observe for any $\beta > 0$ that $$\int_{R_d} ((x-\mu)^t \Sigma^{-1}(x-\mu))^{\beta/2} S_\alpha(x|\mu, \Sigma) dx = \frac{\Gamma\left(\frac{\beta+d}{\alpha}\right)}{\Gamma\left(\frac{d+2}{\alpha}\right)^{\beta/2} \Gamma\left(\frac{d}{\alpha}\right)^{1-\frac{\beta}{2}}}$$

An application of Stirling's formula (see M. Abramowitz and I. Stegan, *Handbook of Mathematical Functions*, Dover Publications, New York, Ninth Dover printing, 1972, pp. 254, 6.1.38)

$$1 < \Gamma(t+1)/\sqrt{2\pi}\, t^{t+1/2} \exp(-t) < \exp(1/12t), \quad t \in R$$

proves the result with $$\lambda := \frac{(\beta+d)^{\beta+d}}{(d+2)^{\beta(d+2)/2} d^{d(1-\beta/2)}}$$

Note that using the same methods as above, we may conclude that $$\lim_{\alpha \to 0^+} \alpha^2 \gamma_\alpha^d(\alpha) = \frac{(d+2)^{d+2}}{e d^d}$$

and $$\tilde{\rho}_d(\alpha) < \rho_d(\alpha) < \exp(\alpha/12) \tilde{\rho}_d(\alpha)$$

where $$\tilde{\rho}_d(\alpha) := \alpha^{-1/2} \frac{\Gamma\left(\frac{d}{2}\right)}{\pi^{\frac{d}{2}+1}} \left[\frac{d^{1+\frac{d}{2}}}{2(d+2)^{\frac{d}{2}}}\right]^{\frac{3}{2}} \left[\frac{(d+2)}{d}\right]^{\frac{d(d+2)}{2\alpha}}$$

Figure 2:
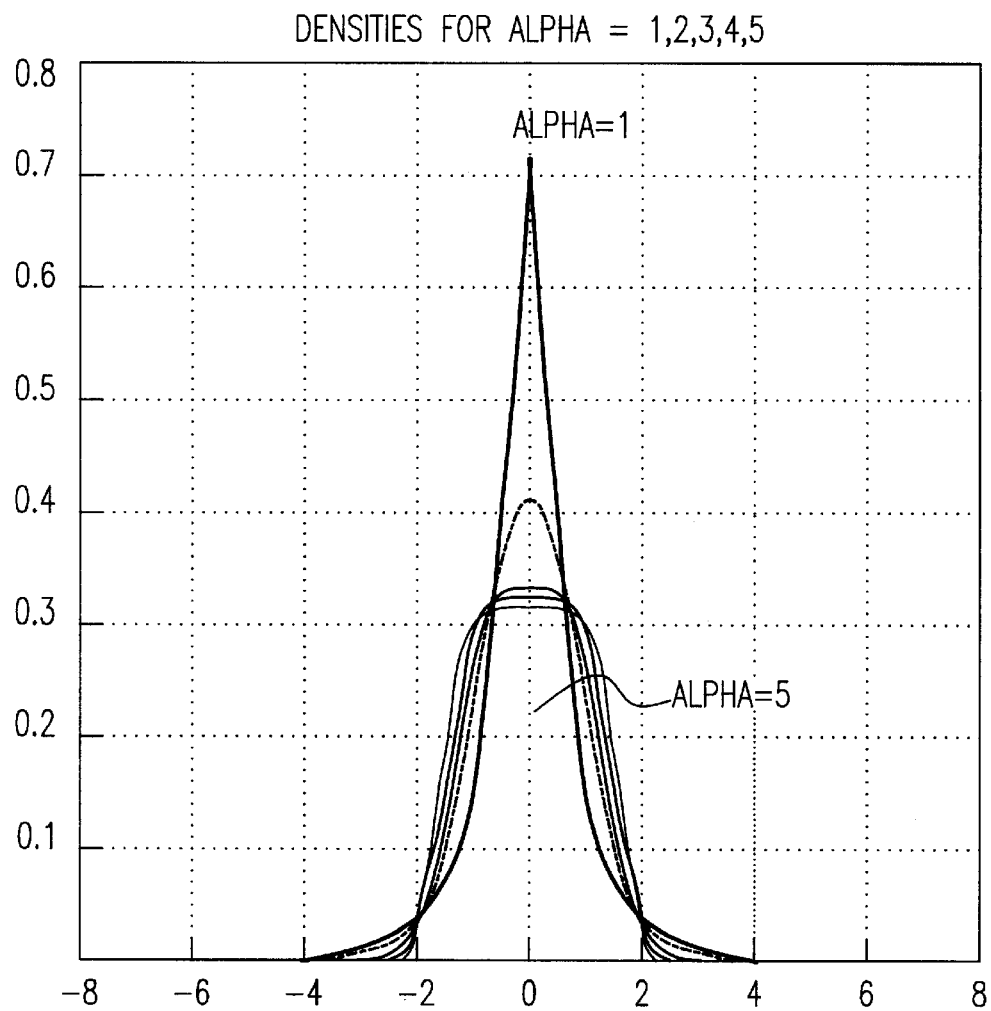
FIG. 2 is a graph showing a one-dimensional density profile for different values of $\alpha$.
Figure 3A:
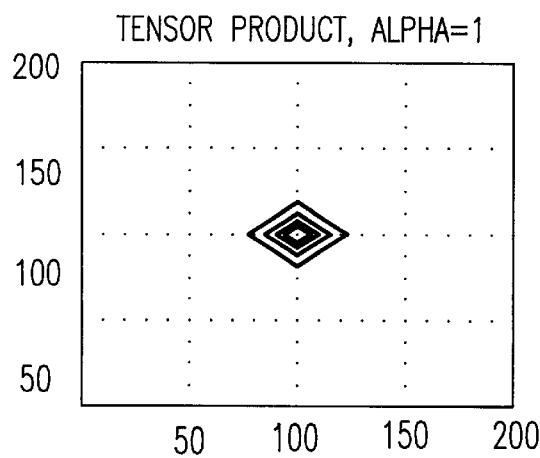
FIGS. 3A, 3B, 3C, and 3D are graphs of level curves of two-dimensional tensor product $\alpha$-density for different values of $\alpha$.
Figure 3B:
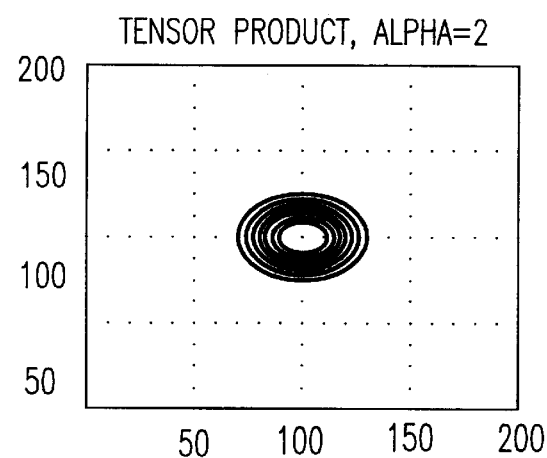
Figure 3C:
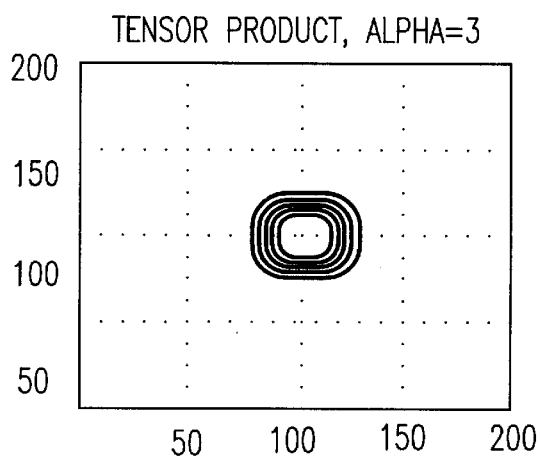
Figure 3D:
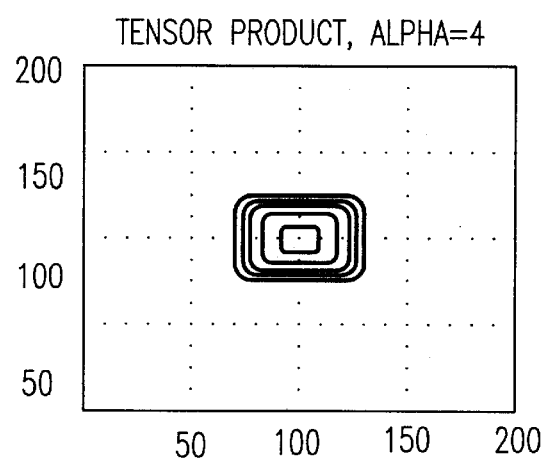

The statement for the tensor product case is exactly the same and is proved in the same way. The univariate α-densities with zero mean and unit variance a graphically shown in FIG. 2. Note that the covariance matrix of the tensor product α-density is the diagonal matrix diag σ. Also, when α is equal to 2 and Σ equals diag σ, then both the spherical α-density and the tensor product α-density are identical with the gaussian density. However, it must be noted that the tensor product α-density is different from the spherical α-density for α≠1 even when Σ is diagonal. In fact, assuming zero means and unit covariances in equations (5) and 6), the contours of constant density for the spherical α-density in equation (5) is given by $$\sum_{i=1}^d x_i^2$$

=constant, whereas contours of constant density for the tensor product α-density in equation (6) is given by $$\sum_{i=1}^d x_i^\alpha$$

=constant. The former set of contors are plotted for different values of α in FIGS. 3A to 3D thereby illustrating the difference between the two densities even for diagonal covariances.

The next example we shall consider is a clipped gaussian density.

EXAMPLE 3

For very ε>0 and t nonegative, we set $$h(t) = \max(0, t-\epsilon).$$

In this case, for every integer n, the moments of the function f=exp(-h) required for the spherical construction are given by the formula $$m_\beta = \frac{\epsilon^\beta}{\beta+1} + \exp(\epsilon) \int_\epsilon^\infty t^\beta \exp(-t) dt, \quad \beta > -1, \; \epsilon > 0.$$

Figure 4:
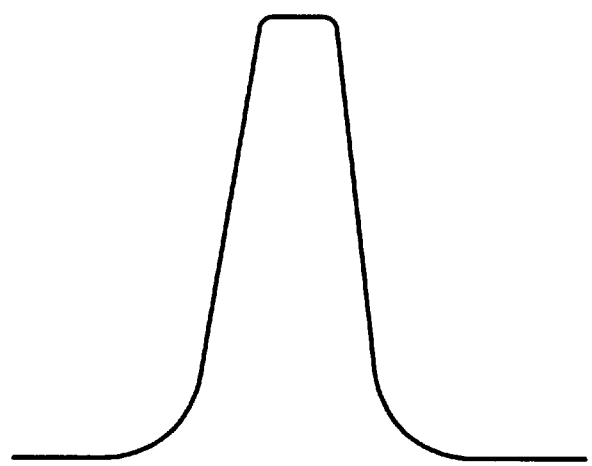
FIG. 4 is a graph of a clipped gaussian curve.

Moreover, for $$r = \left[\frac{d}{2}\right] \left(\text{i.e., the greatest integer} \leq \frac{d}{2}\right)$$

since we get that where we use the definition $(x)_l = \Gamma(x+1)/\Gamma(x-1+l)$. For an example of $$\int_\epsilon^\infty t^{d/2} \exp(-t) dt = \begin{cases} \sum_{l=0}^r (r)_l \epsilon^{r-l} \\ \sum_{l=0}^r \left(\frac{d}{2}\right)_l \epsilon^{\frac{d}{2}-l} + \left(\frac{d}{2}\right)_{r+1} \sqrt{\pi} \exp(\epsilon)(1 - \text{erf}(\sqrt{\epsilon})) \end{cases}$$

$$m_{\frac{d}{2}} = \begin{cases} \sum_{l=1}^r (r)_l \epsilon^{r-l} \\ \sum_{l=1}^r \left(\frac{d}{2}\right)_l \epsilon^{\frac{d}{2}-l} + \left(\frac{d}{2}\right)_{r+1} \sqrt{\pi} \exp(\epsilon)(1 - \text{erf}(\sqrt{\epsilon})) \end{cases}$$

this density see FIG. 4.

The final example we shall consider is a gaussian density with a double exponential tails introduced by P. Huber (see for instance D. M. Titterington, A. F. M. Smith and U. E. Markov, *Statistical Analysis of Finite Mixture Distributions*, Wiley Interscience, New York, 1985, p.23).

EXAMPLE 4

For every ε>0 and t nonegative, we set $$h(t) = \begin{cases} t, & t \leq \epsilon \\ 2\sqrt{\epsilon t} - \epsilon, & t \leq \epsilon \end{cases}$$

The required moments are given by the formula $$m_{\frac{d}{2}} = \Gamma\left(\frac{d}{2}+1\right) - \int_\epsilon^\infty t^{\frac{d}{2}} \exp(-t) dt + \frac{1}{2^{d+1} \epsilon^{\frac{d}{2}}} \sum_{l=0}^d (d)_l \epsilon^{d-l}.$$

Figure 5:
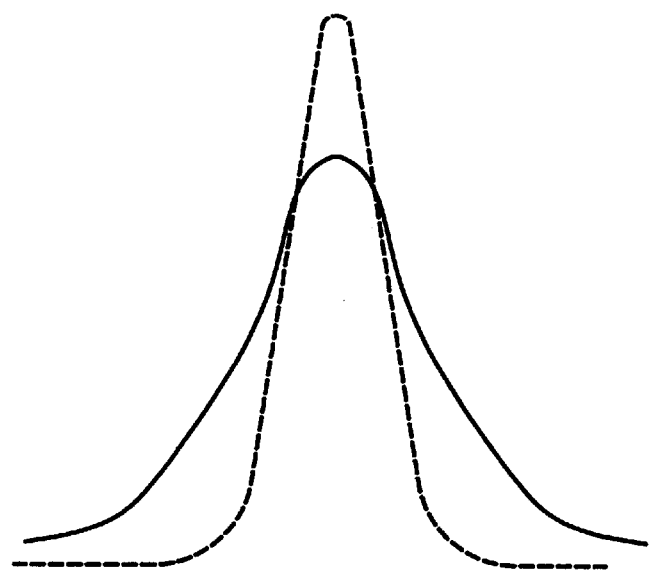
FIG. 5 is a graph of a gaussian curve with double exponential tails.

The corresponding density is a gaussian whose tails have been adjusted to have an exponential decay, see FIG. 5 for its plot.

Maximum Likelihood Estimation

Let $T=\{x^1, x^2, \ldots, x^N\}$ $R^d$ be independent samples from a probability density function p. Then the likelihood function of the data is $$\prod_{k=1}^{N} p(x^k).$$

Given a function f as above, we discuss the problem of determining the value of the mean $\mu$ and $R^d$ and a covariance matrix $\Sigma$ which maximizes the likelihood function for the density $$p(x|\mu, \Sigma) = \rho_d \frac{1}{\sqrt{\det \Sigma}} f(\gamma_d(x-\mu)^t \Sigma^{-1}(x-\mu)), \quad t \in R^d.$$

It is convenient to express f in the form $$f(t) = \exp(-h(t)), \quad t \in R$$

and consider the negative of the log-likelihood function $$-\log L = -N\log\rho_d - \frac{N}{2}\log\det \Sigma^{-1} + \sum_{k=1}^{N}\left(\gamma_d(x^k-\mu)^t \Sigma^{-1}(x^k-\mu)\right) \quad (8)$$

where $x^1, x^2, \ldots, x^N$ are the given data. We introduce the positive definite matrix $\Gamma$, $$\Gamma = \gamma_d^{1/2} \Sigma^{-1/2},$$

the vector
and function F
Therefore, we can express the log-likelihood in the alternate form $$\varphi = \gamma_d^{1/2} \Gamma \mu$$

$$F := F(\Gamma, \varphi) := -N\log\det\Gamma + \sum_{k=1}^{N} h(\|\Gamma x^k - \varphi\|^2).$$

$$-\log L = -N\log\rho_d + \frac{N}{2}\log\gamma_d + F.$$

Thus, maximizing L over $\mu \in R^d$ and $\Sigma \in PD^d$ is equivalent to minimizing F over $\Gamma \in PD^d$ and $\phi \in R^d$. Our first lemma identifies a class of univariate functions f, for which L achieves its maximum $R^d \times PD^d$. To this end, it is convenient to introduce the linear subspace of $R^d$ defined by $$M(T) := \left\{\sum_{k=1}^{N} c_k x^k : \sum_{k=1}^{N} c_k = 0\right\}. \quad (9)$$

Lemma 4 Suppose there exist constants a, b and c, with b, c positive such that $$h(t) \geq a + bt^c, \quad t \in R_+$$

and $$\dim M = d$$

Then L has a maximum on $R^d \times PD^d$.

Proof: Since F is a continuous function of $\Gamma$ and $\Phi$ (and F is $\infty$ when $\Gamma$ is singular), it suffices to prove that F goes to infinity as $(\Gamma, \Phi) \to \infty$. To this end we observe that the function vanishes if and only if both $\Gamma$ and $\mu$ are zero. We conclude that there exists $$\sum_{k=1}^{N} \|\Gamma x^k - \varphi\|^c$$

a positive constant b' such that $$F \geq -N\log\det\Gamma + aN + b'(\|\Gamma\|^c + \|\varphi\|^c)$$

where $\|\Gamma\|$ denotes the Frobenius norm of $\Gamma$. By the Hadamard inequality (see R. A. Horn and C. R. Johnson, *Matrix Analysis*, Cambridge University Press, 1985, p. 477), we obtain that $\det \Gamma \leq \|\Gamma\|^d$, and so $$F \geq -dN\log\|\Gamma\| + aN + b'(\|\Gamma\|^c + \|\varphi\|^c)$$

which proves the result.

The next lemma identifies a condition on h so that L has a unique maximum.

Lemma 5 Let $H(t) := h(t^2)$, $t \in R_+$ and suppose that H is convex on $R_+$. Then L has at most one maximum.

Proof: Recall that as a function of $\Gamma \in PD^d$, $\det \Gamma$ is strictly log concave (see R. A. Horn et al., supra). Hence, the function $F(\Gamma, \phi)$ defined above is a strictly convex function of $\Gamma$ and $\phi$. This proves the result.

When $h(t)=t$, the corresponding spherical density is a gaussian distribution, and in this case, the MLE of $\Sigma$ and $\mu$ are given by the formula $$\mu = \frac{1}{N}\sum_{k=1}^{N} x^k; \quad \Sigma = \frac{1}{N}\sum_{k=1}^{N}(x^k-\mu)(x^k-\mu)^t.$$

Except for this case, the optimal value of $\Sigma$ and $\mu$ must be found by some iterative method.

We begin our discussion of the problem with the univariate case of $\alpha$-density, a case of practical importance to us here. Thus, we have scalar data $\{x_1, x_2, \ldots, x_N\}$, and the negative log-likelihood is $$-\log L = N\log\rho_1(\alpha) + \frac{N}{2}\log\sigma + \gamma_1(\alpha)^{\alpha/2}\sigma^{-\alpha/2}\sum_{k=1}^{N}|x_k-\mu|^\alpha.$$

Notice here that the minimum over $\mu \in R$ and $\sigma \in R_+$ can be performed separately. For this reason, we set $$\omega = \min_\mu \left(\frac{1}{N}\sum_{i=1}^{N}|x_i-\mu|^\alpha\right)^{\frac{1}{\alpha}} = \left(\frac{1}{N}\sum_{i=1}^{N}|x_i-\hat\mu|^\alpha\right)^{\frac{1}{\alpha}}.$$

Since the derivative of $(-\log L)$ with respect to $\sigma$ is given by (at $\mu=\hat\mu$)

$$\frac{d}{d\sigma}(-\log L) = \frac{N}{2\sigma}\left(1 - \frac{\alpha\gamma_1(\alpha)^{\frac{\alpha}{2}}\omega^\alpha}{\sigma^{\frac{\alpha}{2}}}\right)$$

the unique value of $\Sigma$ at which the minimum occurs is $$\hat{\sigma} = \alpha^{\frac{2}{\alpha}}\gamma_1(\alpha)\omega^2. \tag{10}$$

Note that the hypothesis of Lemma 5 is satisfied for $\alpha \geq 1$. Since in this case $\hat{\mu}$ is unique, our computation confirms directly that $-\log L$ has a unique minimum when $\alpha \geq 1$ (but not for $0<\alpha<1$, see below). Besides the case $\alpha=2$, corresponding to the gaussian distribution, we note that when $\alpha=1$ we have $\rho_1(\alpha)=\gamma_1(\alpha)=2$ and so $$\sigma = 2\left(\frac{1}{N}\sum_{i=1}^{N}|x_i - \tilde{\mu}|\right)^2$$

where $\hat{\mu}$ is the median of the data.

In the general case, the minimum value of $-\log L$ has the form $$-\log L = N\{\kappa + \log\omega\}$$

where $$\kappa := \alpha^{-1} + (1-\alpha^{-1})\log\alpha + \log\Gamma(\alpha^{-1})$$

is a constant independent of the data. Therefore, a comparison of the likelihoods of two data sets is equivalent to a comparison of their corresponding w values.

There remains the problem of determining $\hat{\mu}$. Because of its role in the EM algorithm, see below, we accomplish this by the update formula $$\hat{\mu} = \frac{\sum_{i=1}^{N}|x_i - \mu|^{\alpha-2}x_i}{\sum_{i=1}^{N}|x_i - \mu|^{\alpha-2}}. \tag{11}$$

Figure 6:
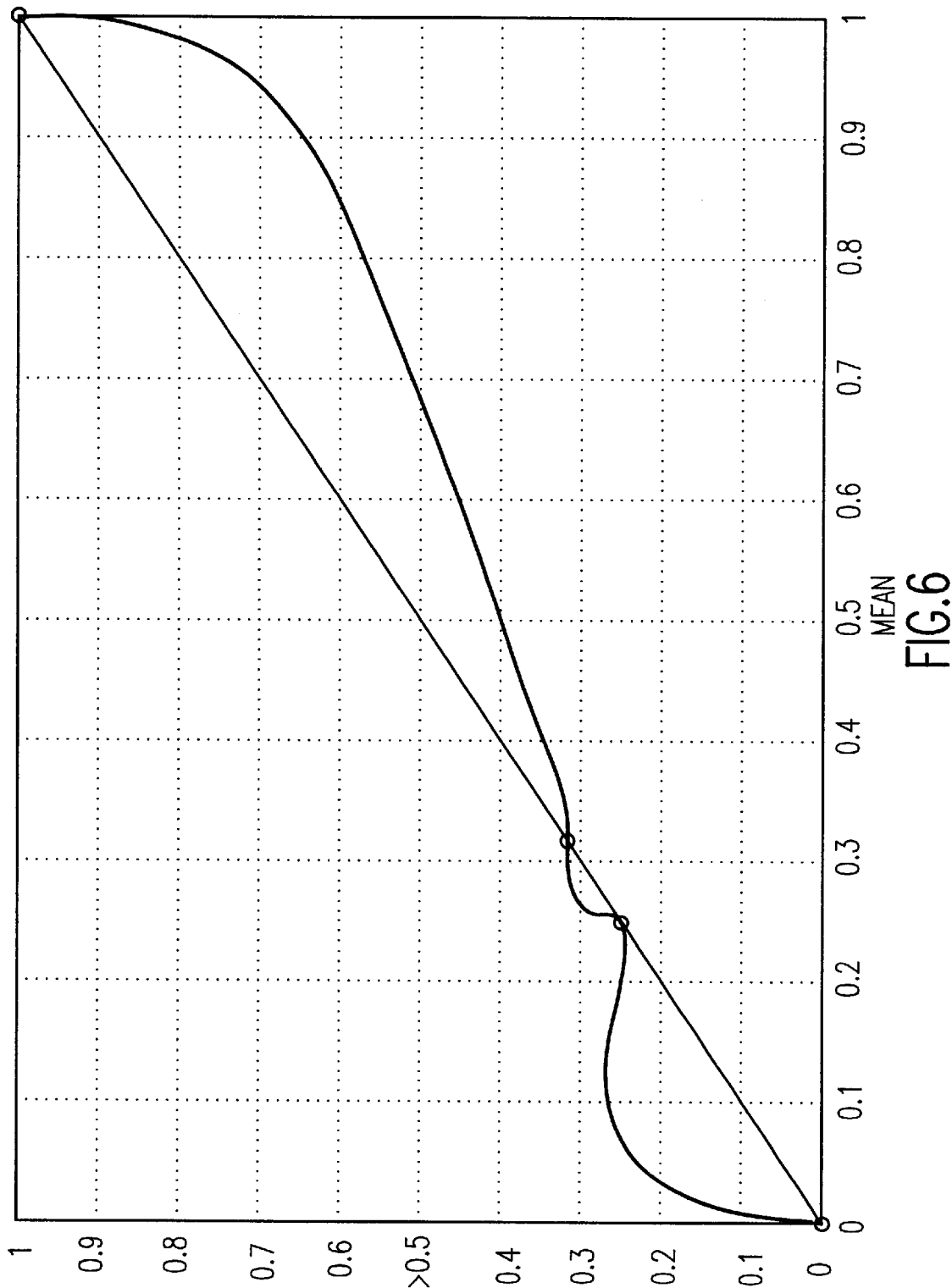
FIG. 6 is a graph demonstrating the four fixed points of the map $V_{3/2}$.
Figure 7:
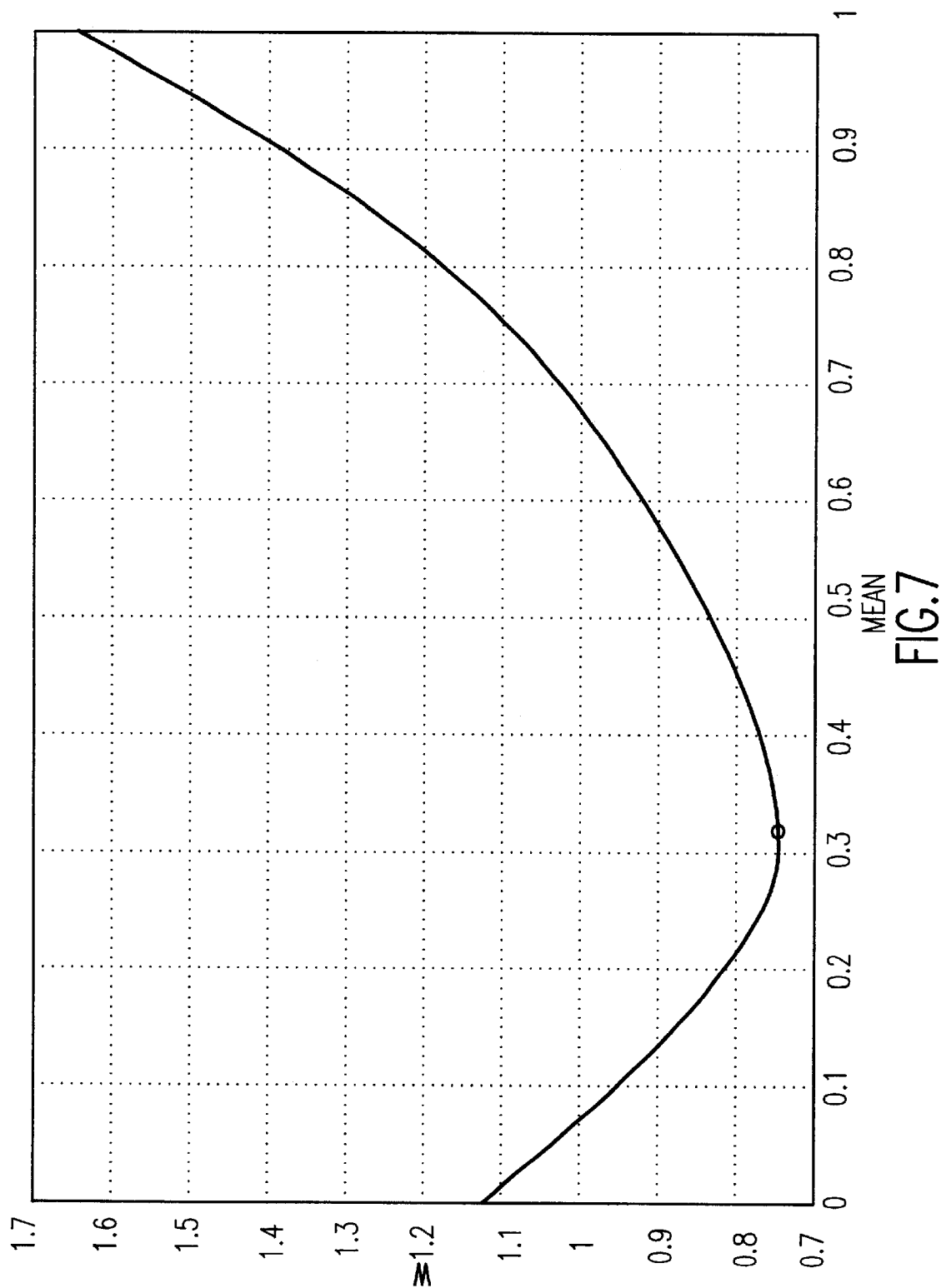
FIG. 7 is a graph of $W_{3/2}(\mu)$ and its minimum as a function of $\mu$.

For $\alpha<2$, care must be taken in the use of this formula. If $\mu=x_l$ for some l, $l=1, \ldots, N$, then $\hat{\mu}=x_l$. Otherwise, division by zero does not occur in equation (11). The method always converges to the unique minimum $\tilde{u}$ of W independent of the choice of the initial value used when $\alpha \geq 2$. the reason for this is two-fold: first, $|\hat{\mu}| \leq \max\{|x_i|; i=1,2, \ldots, N\}$ and secondly, the function $$W_\alpha(\mu) := \sum_{i=1}^{N}|x_i - \mu|^\alpha, \quad \mu \in R \tag{12}$$

is a strictly convex function of $\mu$. Thus, $\hat{\mu}=\mu$ in equation (11) if and only if the derivative of the function of $\mu$ in equation (12) vanishes at $\hat{\mu}$. For $\alpha<2$, the issue of convergence of the iteration is delicate. We divide our comments into two cases. The first case we consider is $1<\alpha 2$. The iteration will converge for a generically chosen initial data. We illustrate this phenomenon with an example. When $\alpha=3/2$, $N=3$, $x_1=0$, $x_2=\frac{1}{4}$, $x_3=1$, the function in equation (12) shown in FIG. 7 has its unique minimum at =0.32. As expected, this value of $\mu$ is a fixed point of the iteration of equation (11). In fact, FIGS. 6 and 7 demonstrate that there is a value of $\mu$ close t 0.1 so that the updated value $\hat{\mu}$ is equal to ¼. Since this is also a fixed point of the mapping in equation (11), all further updates does not change the value of $\mu$. Moreover, starting at any value of $\mu$ except for the (countable) pre-images of $x_2$ (which has zero as its only accumulation points) the iteration of equation (11) will converge geometrically fast to the minimum of equation (12).

We do not present a complete analysis of the convergence of this method here. The following observation provides some insight into what might be expected.

Lemma 6 Suppose $1<\alpha<2$, and let $\{\mu_n: n=1, 2, \ldots\}$ be a sequence generated by the iteration of equation (11), which converges to some $\mu$. Either $\mu$ is equal the unique minimum of the function appearing in equation (12) or there exists an l in the set $\{1, 2, \ldots, N\}$ such that all the elements of the sequence except for a finite number equal $x_l$.

Proof: If $\mu$ is not in the set $\{x_j: j=1, 2, \ldots, N\}$ then $\mu$ must be the unique minimum of the function in equation (12). In the case that $\mu=x_1$ for some $l=1,2, \ldots, N$, there exists a positive number $\epsilon$ such that whenever $|x-x_l|<\epsilon$ it follows that $|V_\alpha(x)-x_l| \leq |x-x_l|$, where $V_\alpha(x)$ is defined to be $$V_\alpha(x) = \frac{\sum_{i=1}^{N}|x_i - x|^{\alpha-2}x_i}{\sum_{i=1}^{N}|x_i - x|^{\alpha-2}}. \tag{13}$$

In other words, all the points $x_1, x_2, \ldots, x_N$ are repelling fixed points of the map of equation (13). Assuming that this be the case, it follows that all but a finite number of this sequence must equal $x_l$. Thus, the proof is completed by demonstrating the existence of the $\epsilon$ mentioned above. To this end, we merely observe that the right and left derivatives of $V\alpha(x)$ at any data point $x_l$, $l=1,2, \ldots, N$ is infinite.

Let is not comment on the case $0<\alpha<1$. In general, the iteration does converge to the minimum of the function W for most initial values. In this regard, we point out that W is strictly concave between each data point and has infinite left and right derivatives at the data points. Hence, there is a unique local maximum between each data point, but in general, there is more than one minimum of W. This means that, in general, the maximum of the likelihood occurs for more than one value of mean and variance.

Figure 8:
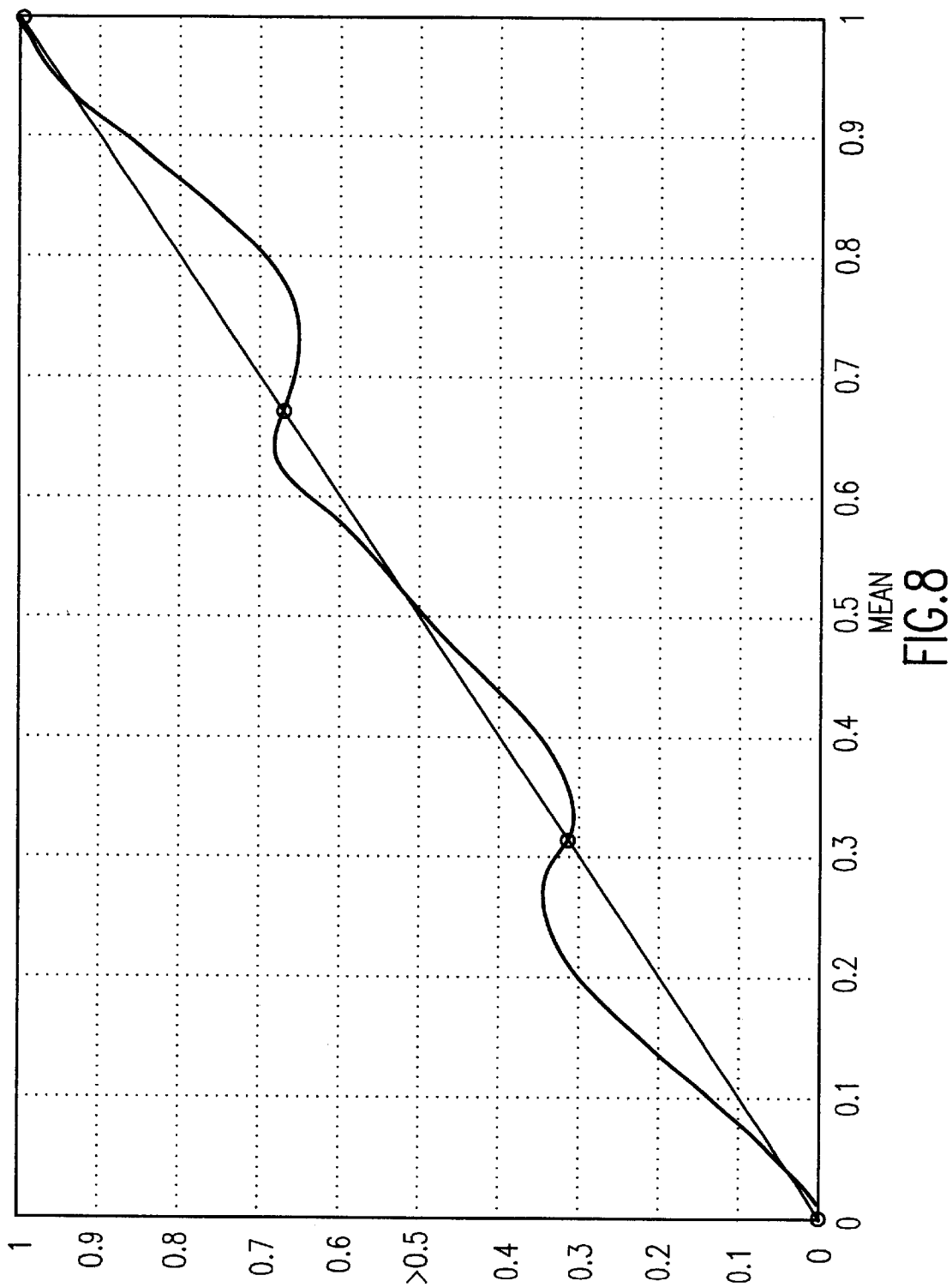
FIG. 8 is a graph of $W_{1/2}(\mu)$ and its minimum as a function of $\mu$.
Figure 9:
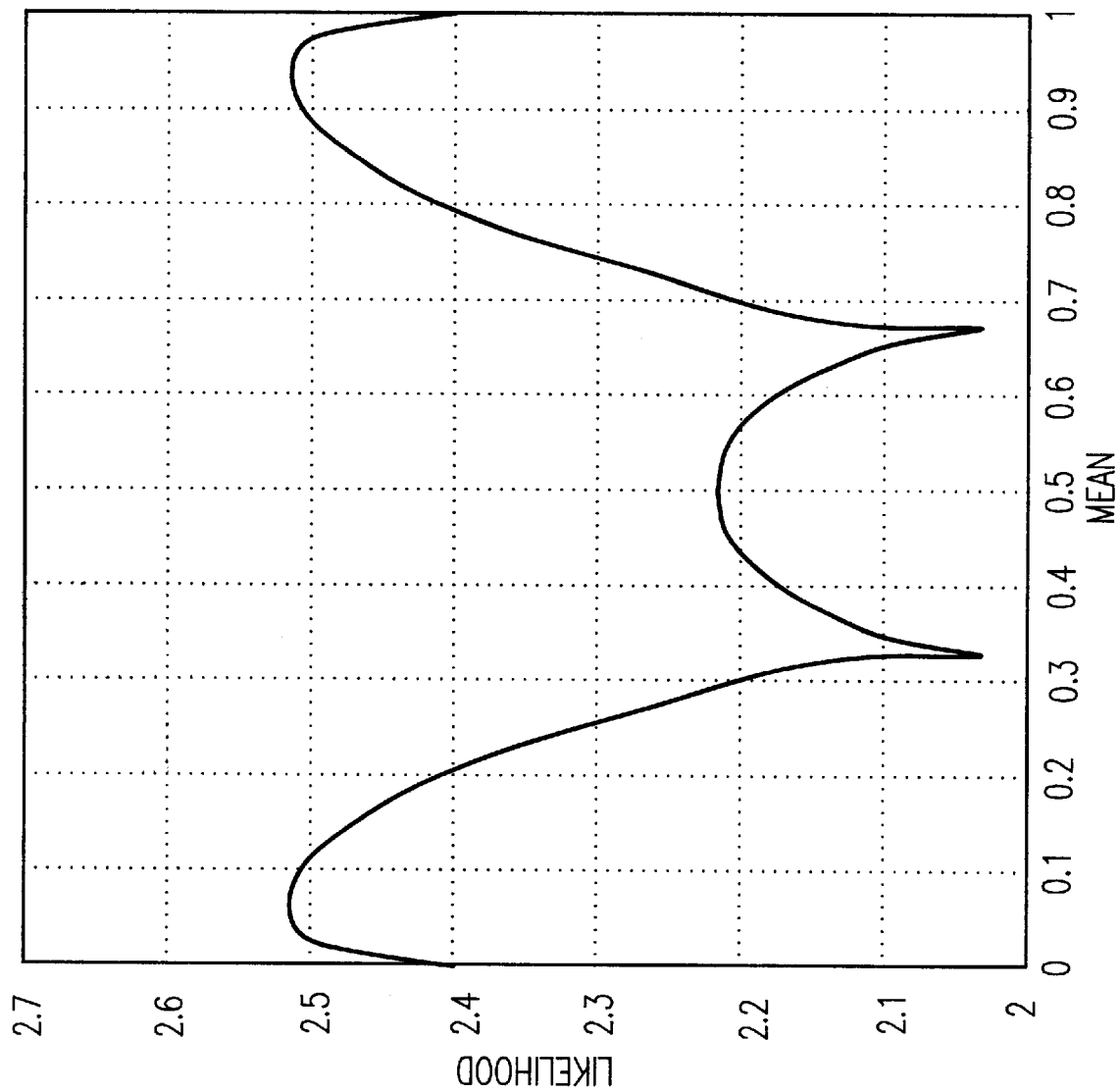
FIG. 9 is a graph demonstrating the seven fixed points of the map $V_{1/2}$.

Our computational experience seems to indicate that the iteration of equation (11) will converge to the data point within the between two consecutive local maxima of the function W, in which the initial value lies. We illustrate this with an example when $\alpha=0.5$ and $x_i=i/10$, $i=1, \ldots 10$. The function W is shown in FIG. 8 and the function in equation (13) for $\alpha=\frac{1}{2}$ is shown in FIG. 9.

Other iterations besides equation (11) can be used to find $\hat{\mu}$ as well. For example, since the function appearing in equation (12) is convex, one can use a search method combined with Newton iteration to provide a fast globally convergent algorithm, locating the minimum of this function.

Returning to the general spherical model, we address the question of iterative methods for finding the MLE. To this end, we compute the variation of log L relative to $\mu$ $$\nabla_\mu \log L = 2\gamma_d \Sigma^{-1} \left( \sum_{k=1}^{N} h'(Q(x^k|\mu, \Sigma)(x^k - \mu) \right)$$

where $$Q(x|\mu, \Sigma) := \gamma_d (x - \mu)^t \Sigma^{-1} (x - \mu), \ x \in R^d$$

and for the variation relative to $\Sigma$ we have that $$\nabla_{\Sigma^{-1}} \log L = \sum_{k=1}^{N} \left\{ \frac{1}{2} \Sigma - \gamma_d h'(Q(x^k|\mu, \Sigma))(x^k - \mu)(x^k - \mu)^t \right\}.$$

Thus, $(\mu, \Sigma)$ is a stationary point of L is and only if $$\mu = \frac{\sum_{k=1}^{N} h'(Q(x^k|\mu, \Sigma)) x^k}{\sum_{k=1}^{N} h'(Q(x^k|\mu, \Sigma))} \quad (14)$$

and $$\Sigma = \frac{2\gamma_d}{N} \sum_{k=1}^{N} h'(Q(x^k|\mu, \Sigma))(x^k - \mu)(x^k - \mu)^t. \quad (15)$$

These formulas suggest the iteration scheme in which the updates $\hat{\mu}$ and $\hat{\Sigma}$ for the mean $\mu$ and the variance $\sigma$ are respectively given by $$\hat{\mu} = \frac{\sum_{k=1}^{N} h'(Q(x^k|\mu, \Sigma)) x^k}{\sum_{k=1}^{N} h'(Q(x^k|\mu, \Sigma))}$$

$$\hat{\Sigma} = \frac{2\gamma_d}{N} \sum_{k=1}^{N} h'(Q(x^k|\mu, \Sigma))(x^k - \mu)(x^k - \mu)^t.$$

which are related to the EM algorithm (see A. P. Dempster, N. M. Laird and d. B. Baum, "Maximum likelihood from incomplete data via the EM algorithm", *Journal of Royal Statistical Soc.*, Ser. B, vol. 39, pp.1–38, 1977, and Richard Redner and Homer Walker, "Mixture densities, maximum likelihood and the EM algorithm, *SIAM Review*, vol. 26, no. 2, April 1984), discussed below.

Before getting to this matter, we comment on the convergence of this iteration. All our remarks concern the univariate case. In this case, we rewrite the iteration in terms of the parameters $\mu$ and $\sigma$ corresponding to scalar data $\{x_1, x_2, \ldots, x_N\}$; thus $$\hat{\mu} = \frac{\sum_{k=1}^{N} h'\left( \frac{\gamma_1 (x_k - \mu)^2}{\sigma} \right) x^k}{\sum_{k=1}^{N} h'\left( \frac{\gamma_1 (x_k - \mu)^2}{\sigma} \right)} \quad (16)$$

and $$\hat{\sigma} = \frac{2\gamma_1}{N} \sum_{k=1}^{N} h'\left( \frac{\gamma_1 (x_k - \mu)^2}{\sigma} \right) (x_k - \mu)^2 \quad (17)$$

In general, this iteration does not converge. To see this, we specialize it to the case of Example 1 and observe that in this case, it has the form $$\hat{\sigma} = A(\mu) / \sigma^\beta \quad (18)$$

where $$A(\mu) := \frac{\alpha \gamma_1 (\alpha)^{\alpha/2}}{N} W_\alpha(\mu), \ \beta := \alpha/2 - 1,$$

and $$\hat{\mu} = V_\alpha(\mu). \quad (19)$$

We have already pointed out that the iteration for the mean $\mu$ converges independent of the initial guess (see discussion after equation (11)) when $\alpha \geq 2$. To simplify our exposition, we consider the case that the initial value in the iteration for the mean is chosen to be the minimum of the function appearing in equation (12). In this case, the updated value of the mean and hence also the constant appearing in equation (18) does not change. Let us call this positive constant A. Also, for simplicity, we choose $\alpha = 4$. Thus, the iteration equation (18) takes the form It follows directly, that the solution of this iteration is given by the formula $$\sigma_{n+1} = \frac{A}{\sigma_n^2}; \ n = 1, 2, \ldots$$

$$\sigma_{n+1} = A^{\frac{1}{3}} \left( \frac{\sigma_1}{A^{\frac{1}{3}}} \right)^{(-1)^n 2^n}, \ n = 1, 2, \ldots$$

The value of $\sigma$ we seek is $A^{1/3}$, (see equation (10)). However, this iteration fails to produce this value except when $\sigma_1$ is chosen to be $A^{1/3}$. Of course, in this simple example, it is not recommended to use the update formula (18), since optimum value of a can be directly obtained (see equation (10)). This example does suggest a means to modify the iteration of equation (17) under certain conditions on the function h. We present this observation in the following lemma.

LEMMA 7

Suppose the following four conditions hold.

The hypothesis of Lemma 5 holds.

There are nonnegative constants a, b, c such that $0 < h'(t) \leq a + bf$; $t \in R^+$.

$\beta := \underline{\lim}_{t \to 0+} fh'(t-1) > 0$

The data set $\{x_k: k=1, 2, \ldots, N\}$ consists of at least two points. Then there exists a positive constant $\kappa$ such that, if $\sigma$ is at most $\kappa$, then $\hat{\sigma}$ defined by the formulas $$\hat{\mu} = \frac{\sum_{k=1}^{N} h'\left(\frac{\gamma_1(x_k - \mu)^2}{\sigma}\right) x_k}{\sum_{k=1}^{N} h'\left(\frac{\gamma_1(x_k - \mu)^2}{\sigma}\right)}$$

$$\hat{\sigma}^{1+c} = \frac{2\gamma_1}{N} \sum_{k=1}^{N} h'\left(\frac{\gamma_1(x_k - \mu)^2}{\sigma}\right)(x_k - \mu)^2 \sigma^c$$

is also at most $\kappa$. Moreover, this iteration converges whenever the initial value of $\sigma$ is at most $\kappa$.

Proof: Set $M = \max\{|x_i|: i=1, 2, \ldots, N\}$ and first observe that $|\hat{\mu}| \leq M$. Similarly, we obtain that $$\hat{\sigma}^{1+c} \leq u + v\sigma^c$$

where $\mu$ and $\nu$ are positive constants depending on a, b, c, M but not on $\sigma$ or N. Set $$\kappa = \max\left\{2v, \left(\frac{u}{v}\right)^{\frac{1}{c}}\right\}.$$

We claim that if $\sigma \leq \kappa$, then $\hat{\sigma} \leq \kappa$. If $\hat{\sigma} \leq \sigma$, there is nothing to prove. When $\hat{\sigma} \geq \sigma$, then the above inequality implies that

$$\hat{\sigma}^{1+c} \leq u + v\hat{\sigma}^c.$$

When $$\hat{\sigma} \leq \left(\frac{u}{v}\right)^{\frac{1}{c}},$$

then again there is nothing to prove. For $$\hat{\sigma} \geq \left(\frac{u}{v}\right)^{\frac{1}{c}},$$

we have that $b\hat{\sigma}^c \geq \mu$ and so $$2v\hat{\sigma} \geq u + v\hat{\sigma}^c \geq u + v\sigma^c \geq \hat{\sigma}^{1+c};$$

that is, $\hat{\sigma} \leq 2v$. Hence, under all circumstances we conclude that $\hat{\sigma} \leq \kappa$.

Now, let $\{(\mu_n, \sigma_n): n=1, 2, \ldots, \}$ be a sequence produced by this iteration, where $\sigma_1$ is at most $\kappa$. Then by our remarks so far, both the sequence of means and variances have a subsequence which converge to some limit, $\sigma_{opt}$, respectively. From the variances update formula and conditions three and four, we have that $$\sigma_{opt}^{1+v} = \underline{\lim}_{n \to \infty} \sigma_n^{1+c}$$

$$= \frac{2\gamma_1}{N} \lim_{n \to \infty} \sum_{k=1}^{N} h'\left(\frac{\gamma_1(x_k - \mu)^2}{\sigma}\right)(x_k - \mu)^2 \sigma_n$$

$$= \frac{2\gamma_1}{N} \sum_{k=1}^{N} (x_k - \mu_{opt})^{2c+2} > 0.$$

Hence, we conclude that $\sigma_{opt} > 0$. This means that $\mu_{opt}, \sigma_{opt}$ are stationary points of the likelihood function. However, the first condition guarantees the uniqueness of the stationary point. Therefore, the iterate converges as long as $\sigma_1$ is at most $\kappa$.

MIXTURE MODELS

In this section we describe the probability densities which we shall use in our classification experiments. They are built up from mixture models based on the four densities described earlier. Constructing mixture models from a given parametric family is a general procedure. Specifically, starting with a parametric family $p(\cdot|\lambda)$, $\lambda \in \Omega \subset R^q$ of probability densities on $R^d$, a mixture model with m mixtures with mixture weights $w_i$; $i=1, 2, \ldots, m$ has the form $$P(x|\omega, \Lambda) := \sum_{i=1}^{m} \omega_i p(x|\lambda_i), \quad \sum_{i=1}^{m} \omega_i = 1, \quad \omega_i \geq 0,$$

where $\Lambda = (\lambda_1, \lambda_2, \ldots, \lambda_m)$ is chosen from $\Omega^m = \Omega \times \Omega \times \ldots \times \Omega$, m times and $\omega = (\omega_1, \omega_2, \ldots, \omega_m)$ is a vector with nonnegative components which sum to one. The densities $p(\cdot|\lambda_1), p(\cdot|\lambda_2), \ldots, p(\cdot|\lambda_m)$ are called the mixture components P. Note the linear dependency of the mixture model P on the mixture weights.

Given data vectors $\{x^k: k=1, 2, \ldots, N\}$ in $R^d$, the goal here is to choose the parameter $\Lambda \in \Omega^m$ and the mixture weights $\omega = (\omega_1, \omega_2, \ldots, \omega_m)$ to maximize the log-likelihood function $$\log L = \sum_{k=1}^{N} P(x^k|\omega, \Lambda). \tag{20}$$

To this end, we first compute the variation of the log-likelihood relative to the mixture weight $\omega_l$, $l=1, 2, \ldots, m$ which is given by $$\frac{\partial \log L}{\partial \omega_l} = \sum_{k=1}^{N} \frac{p(x^k|\lambda_l)}{P(x^k|\omega, \Lambda)}, \quad l = 1, 2, \ldots, m.$$

Keeping in mind that the mixture weights sum to unity, we are led to the equation $$\frac{1}{N} \sum_{k=1}^{N} \frac{p(x^k|\lambda_l)}{P(x^k|\omega, \Lambda)}, \quad l = 1, 2, \ldots, m. \tag{21}$$

This equation for the mixture weights holds independent of the form of the mixture components and suggests the importance of the posterior probabilities $$P_l(x|\omega, \Lambda) = \frac{\omega_l p(x|\lambda_l)}{P(x|\omega, \Lambda)}, \quad l = 1, 2, \ldots, m, \quad x \in R^d \quad (22)$$

Thus, equation (21) becomes $$\frac{1}{N}\sum_{k=1}^{N} P_l(x|\omega, \Lambda) = \omega_l, \quad l = 1, 2, \ldots, m \quad (23)$$

and by the definition of the posterior probability we have that $$\sum_{l=1}^{m} P_l(x|\omega, \Lambda) = 1, \quad x \in R^d \quad (24)$$

To proceed further, we specify the mixture components to be of the spherical type as in equation (2). In this case, $$\log p(x|\mu, \Sigma) = \frac{1}{2}\log\det\Sigma^{-1} - h(Q(x|\mu, \Sigma)) + \log \rho_d, \quad x \in R^d$$

where $$Q(x|\mu, \Sigma) := \gamma_d(x-\mu)^t \Sigma^{-1}(x-\mu), \quad x \in R^d$$

Hence, we conclude that $$\nabla_\mu \log p(x|\mu, \Sigma) = 2\gamma_d h'(Q(x|\mu, \Sigma))\Sigma^{-1}(x-\mu), \quad x \in R^d$$

and $$\nabla_{\Sigma^{-1}} \log p(x|\mu, \Sigma) = \frac{1}{2}\Sigma - \gamma_d h'(Q(x|\mu, \Sigma))(x-\mu)(x-\mu)^t, \quad x \in R^d.$$

Thus, for $l=1, 2, \ldots, m$, the stationary equation for the m mixture means are $$\mu^l = \frac{\sum_{k=1}^{N} P_l(x^k|\omega, \psi) h'(Q(x^k|\mu^l, \Sigma^l)) x^k}{\sum_{k=1}^{N} P_l(x^k|\omega, \psi) h'(Q(x^k|\mu^l, \Sigma^l))}, \quad (25)$$

and for the variance $$\Sigma^l = 2\gamma_d \frac{\sum_{k=1}^{N} P_l(x^k|\omega, \psi) h'(Q(x^k|\mu^l, \Sigma^l))(x^k-\mu^l)(x^k-\mu^l)^t}{\sum_{k=1}^{N} P_l(x^k|\omega, \psi)} \quad (26)$$

where $\Psi=(\mu^1, \Sigma^1, \ldots, \mu^m, \Sigma^m)$ is the parameter vector of all the means and matrices. These equations suggest the following update formulas for the means $$\hat{\mu}^l = \frac{\sum_{k=1}^{N} P_l(x^k|\omega, \psi) h'(Q(x^k|\mu^l, \Sigma^l)) x^k}{\sum_{k=1}^{N} P_l(x^k|\omega, \psi) h'(Q(x^k|\mu^l, \Sigma^l))}, \quad (27)$$

and for the variance $$\hat{\Sigma}^l = 2\gamma_d \frac{\sum_{k=1}^{N} P_l(x^k|\omega, \psi) h'(Q(x^k|\mu^l, \Sigma^l))(x^k-\mu^l)(x^k-\mu^l)^t}{\sum_{k=1}^{N} P_l(x^k|\omega, \psi)} \quad (28)$$

with $l=1, 2, \ldots, m$.

Since the problem under consideration is an example of an incomplete data estimation problem (see, for example, the recent book of Christopher M. Bishop, *Neural Networks for Pattern Recognition,* Cambridge University Press, 1997, for details), the general philosophy of the EM algorithm as described by A. P. Dempster et al., supra, applies. We briefly review the details of the EM algorithm here as it applies to our context. In this regard, we find the point of view of L. E. Baum, Ted Petrie, George Soules, and Norman Weiss in their article "A maximization technique occurring in the statistical analysis of probabilistic functions of Markov chains", *The annals of Math. Stat.,* vol. 41, no. 1, pp. 164–171, 1970, particularly illuminating. We adopt the notation from that article and let X be a totally finite measure space with measure $\mu$. Let $\Theta$ be a subset of some euclidian space and for every $\theta \in \Theta$, we suppose that $p(\cdot, \theta)$ is a positive real valued function on X. Let $$P(\theta) = \int_X p(x, \theta) d\mu(x) \quad (29)$$

and $$Q(\theta, \bar{\theta}) = \int_X p(x, \theta) \log p(x, \bar{\theta}) d\mu(x). \quad (30)$$

Using the concavity of the logarithm, it was shown in L. E. Baum, et al., supra, that $P(\theta) \leq P(\bar{\theta})$ whenever $Q(\theta,\theta) \leq Q(\theta, \bar{\theta})$. Let us suppose that we are given N functions of the form $$P_l(\theta) = \int_X p_l(x, \theta) d\mu(x), \quad l = 1, 2, \ldots, N.$$

We form from these functions the generalized likelihood function $$L(\theta) = \prod_{l=1}^{N} P_l(\theta)$$

and observe that $$L(\theta) = \int_{X^N} p^N(x, \theta) d\mu_N(x)$$

where $$p^N(x, \theta) = \prod_{i=1}^{N} p_i(x_i, \theta), \quad x = (x_1, x_2, \ldots, x_N) \in X^N,$$

$$X^N = X \times X \times \cdots \times X, \quad N \text{ times,}$$

and $$d^i\mu(x) = d^i\mu(x_1) d^i\mu(x_2) \cdots d^i\mu(x_N).$$

Therefore, we see that $L(\theta)$ is the type of function considered in equation (29). Moreover, the corresponding function $Q(\theta, \bar{\theta})$ in equation (29) in this case becomes $$Q(\theta, \bar{\theta}) = \int_X \sum_{l=1}^{N} \frac{p_l(x, \theta)}{P_l(\bar{\theta})} \log p_l(x, \bar{\theta}) d\mu(x). \quad (31)$$

To apply these remarks to the mixture model example, we choose $X = \{1, 2, \ldots, m\}$ and $d\mu$ to be the counting measure on X. Also, we choose $$p_1(i, \Theta) = \omega_i p(x_1 | \lambda_i); \quad i \in X, \quad l = 1, 2, \ldots, N$$

and $\theta = (\omega, \Lambda)$ so that $$P_1(\Theta) = P(x_1 | \omega, \Lambda), \quad l = 1, 2, \ldots, N.$$

Thus, we see that the generalized likelihood function agrees with the mixture model likelihood and, moreover, the function in equation (31) becomes $$\sum_{l=1}^{N} \sum_{i=1}^{m} P_i(x^l | \omega, \Lambda) \log(\overline{\omega_i} p(x^l | \overline{\lambda_i})). \quad (32)$$

Thus, our objective is to maximize the quantity given by equation (32) with respect to the parameters $\overline{\omega}$, $\overline{\mu}$ and $\overline{\Sigma}$ subject to the constraint that the components of the mixture vector $\overline{\omega}$ are nonnegative and add to unity. Using the same computation as in the derivative of the stationary equations (25) and (26), we see stationary points of the function (32) are described by the following formulas for $i = 1, 2, \ldots, m$ $$\hat{\mu}^i = \frac{\sum_{k=1}^{N} P_i(x^k | \omega, \psi) h'\left(Q(x^k | \hat{\mu}^i, \hat{\Sigma}^i)\right) x^k}{\sum_{k=1}^{N} P_i(x^k | \omega, \psi) h'\left(Q(x^k | \hat{\mu}^i, \hat{\Sigma}^i)\right)}, \quad (33)$$

$$\hat{\Sigma}^i = 2\gamma_d \frac{\sum_{k=1}^{N} P_i(x^k | \omega, \psi) h'\left(Q(x^k | \hat{\mu}^i, \hat{\Sigma}^i)\right)(x^k - \mu^i)(x^k - \mu^i)^t}{\sum_{k=1}^{N} P_i(x^k | \omega, \psi)} \quad (34)$$

and $$\hat{\omega}_i = \frac{1}{N} \sum_{k=1}^{N} N P_i(x^k | \omega, \psi). \quad (35)$$

Let us provide conditions in which the update equations (33) to (35) have a unique solution. Clearly, equation (34) determines the new mixture weight components from the old values of the mixture weights, means and covariances. The equations (33) to (35) may have multiple solutions. However, any such solution provides a stationary point for the function $$G(\Psi) = \sum_{i=1}^{m} J_i(\tilde{\mu}^i, \tilde{\Sigma}^i)$$

where $$\Psi = (\tilde{\mu}^1, \tilde{\Sigma}^1, \tilde{\mu}^2, \tilde{\Sigma}^2, \ldots, \tilde{\mu}^m, \tilde{\Sigma}^m) \quad (36)$$

and $$J_i(\tilde{\mu}, \tilde{\Sigma}) := -\frac{1}{2} \sum_{k=1}^{N} P_i(x^k | \omega, \psi) \log \det \tilde{\Sigma}^{-1} +$$

$$\sum_{k=1}^{N} P_i(x^k | \omega, \psi) h(Q(x^k | \tilde{\mu}^i, \tilde{\Sigma}^i)).$$

Note that each summand in equation (36) only depends on $\mu^i$, $\Sigma^i$ and not $\mu^j$, $\Sigma^j$ for any $j \neq i$. This means that the minimization can be done for each i, $i = 1, 2, \ldots, m$ separately. For each i, the i-th function $J_i$ has a similar form as the negative log-likelihood of equation (8). Since the constants $P_i(x^k | \omega, \Psi)$ are all nonnegative (and are independent of $\mu^i$, $\Sigma^i$) we conclude that if the function h satisfies the hypothesis of Lemmas 4 and 5 and the (potentially) reduced data set $$T_i := \{x^k : P_i(x^k | \omega, \Psi) > 0\}$$

satisfies the condition of Lemma 4. The $J_i$ has a unique minimum. We state this observation formally below.

LEMMA 8

Given means $\{\mu^1, \mu^2, \ldots, \mu^m\}$ and variances $\{\Sigma^1, \Sigma^2, \ldots, \Sigma^m\}$ and mixture weights $\omega = (\omega_1, \omega_2, \ldots, \omega_m)$, let $P_i(x | \omega, \Psi)$, $i = 1, 2, \ldots, m$, $x \in R^d$ be corresponding posterior probabilities for spherical mixture models of equation (24) based on the function h. Suppose h satisfies the condition of Lemmas 4 and 5 and each $i = 1, 2, \ldots, m$, the data sets $$T_i = \{x^k : P_i(x^k | \omega, \Psi) > 0, \quad k = 1, 2, \ldots, m\}$$

satisfy the condition of Lemma 4. Then the maximization step of the EM algorithm as given by equations (33) to (35) have a unique solution, $\overline{\mu}^1, \overline{\mu}^2, \ldots, \overline{\mu}^m$, and $\overline{\Sigma}^1, \overline{\Sigma}^2, \ldots, \overline{\Sigma}^m$. Proof: We already commented on the uniqueness. The existence follows the proof of Lemma 4.

Note that in the gaussian case, $h'(t) = 1$ for $t \in R_+$, and as a consequence, the right hand side of equation (33) involve "old" values only. Having computed $\hat{\mu}^i$ from equation (33), the right hand side of equations (34) and (35) can be conveniently computed next. Thus, these provide a set of computable iterations. However, in the nongaussian case, the right hand side of equation (33) depends on the new values. The same comment applies for equation (34) as well. This makes the iterations more complicated in the nongaussian case. However, one strategy is to iterate equation (33) alone with a fixed value of $\Sigma$, and when the iteration has produced satisfactory value for the new value of the mean, one can proceed to equation (31) and iterate with this new value of it fixed until satisfactory values for the new covariances are obtained. Other variants of this strategy can be thought of. In all likelihood, such iterative strategies may not increase likelihood, and, therefore, violate the EM principle. Given this dilemma, we take the simplest approach and merely iterate each of the equations (33) and (34) once to obtain new values for the means and the covariances as in equations (27) and (28).

It is important to extend the discussion of this section to cover the densities appearing in Lemma 2. Keeping in mind the notation used in this lemma the stat nary equations for the means and covariances respectively become for l=1, 2, ..., rn, r=1, 2

$$\mu_r^l = \frac{\sum_{k=1}^{N} P_{lr}(x^k|\omega, \psi) h'(Q(x_r^k|\mu_r^l, \Sigma_r^l)) x^k}{\sum_{k=1}^{N} P_{lr}(x^k|\omega, \psi) h'(Q(x^k|\mu_r^l, \Sigma_r^l))}, \quad (37)$$

and $$\Sigma_r^l = 2\gamma_d \frac{\sum_{k=1}^{N} P_{lr}(x^k|\omega, \psi) h'(Q(x_r^k|\mu_r^l, \Sigma_r^l))(x^k - \mu_r^l)(x^k - \mu_r^l)^t}{\sum_{k=1}^{N} P_{lr}(x^k|\omega, \psi)} \quad (38)$$

where $$P_{lr}(x|\omega, \psi) = \frac{p(x^k|\mu_r^l, \Sigma_r^l)}{P(x|\omega, \psi)}.$$

The special cases which we shall deal with always make use of covariance matrices that are diagonal. If the means and variances of the mixture components are $\mu^1, \mu^2, \ldots, \mu^m$ and $\sigma^1, \sigma^2, \ldots, \sigma^m$, we have for l=1, ..., m; r=1, ..., d the tensor produce densities the iterations and where $\psi = (\mu^1, \sigma^1, \mu^2, \sigma^2, \ldots, \mu^m, \sigma^m)$ is the vector of all means and variances.

The forms of the update formulas used in our numerical experiment $$\mu_r^l = \frac{\sum_{k=1}^{N} P_{lr}(x|\omega, \psi) h'\left(\gamma_1\left(\frac{(x_r^k - \mu_r^l)^2}{\sigma_r^l}\right)\right) x_r^k}{\sum_{k=1}^{N} P_{lr}(x|\omega, \psi) h'\left(\gamma_1\left(\frac{(x_r^k - \mu_r^l)^2}{\sigma_r^l}\right)\right)},$$

$$\sigma_r^l = 2\gamma_1 \frac{\sum_{k=1}^{N} P_{lr}(x|\omega, \psi) h'\left(\gamma_1\left(\frac{(x_r^k - \mu_r^l)^2}{\sigma_r^l}\right)\right)(x_r^k - \mu_r^l)^2}{\sum_{k=1}^{N} P_{lr}(x|\omega, \psi)}$$

are shown below.

TENSOR PRODUCT α-DENSITY

For l=1, 2, ..., m and r=1, 2, ..., d, we have:

$$\mu_r^l = \frac{\sum_{k=1}^{N} P_{lr}(x^k|\omega, \psi)|x_r^k - \mu_r^l|^{\alpha-2} x_r^k}{\sum_{k=1}^{N} P_{lr}(x^k|\omega, \psi)|x_r^k - \mu_r^l|^{\alpha-2}}$$

and $$\sigma_r^l = \gamma_1(\alpha) \left[\alpha \frac{\sum_{k=1}^{N} P_{lr}(x^k|\omega, \psi)|x_r^k - \mu_r^l|^{\alpha}}{\sum_{k=1}^{N} P_{lr}(x^k|\omega, \psi)}\right]^{\frac{2}{\alpha}}.$$

Finally, for the clipped gaussian density case we have:

SPHERICAL α-DENSITY

For l=1, 2, ..., m and r=1, 2, ..., d, $$\mu_r^l = \frac{\sum_{k=1}^{N} P_{lr}(x^k|\omega, \psi)\left(\sum_{s=1}^{d} \sigma_s^{-1}(x_s^k - \mu_s^l)^2\right)^{\frac{\alpha-1}{2}} x_r^k}{\sum_{k=1}^{N} P_{lr}(x^k|\omega, \psi)\left(\sum_{s=1}^{d} \sigma_s^{-1}(x_s^k - \mu_s^l)^2\right)^{\frac{\alpha-2}{2}}}$$

and the variances $$\sigma_r^l = \alpha\gamma_d(\alpha)^{\alpha/2} \frac{\sum_{k=1}^{N} P_{lr}(x^k|\omega, \psi)\left(\sum_{s=1}^{d} \sigma_s^{-1}(x_s^k - \mu_s^l)^2\right)^{\frac{\alpha-2}{2}}(x_r^k - \mu_r^l)^2}{\sum_{k=1}^{N} P_{lr}(x^k|\omega, \psi)}$$

CLIPPED GAUSSIAN DENSITY $$\mu^l = \frac{\sum_{k \in G^l} P_{lr}(x^k|\omega, \psi) x^k}{\sum_{k \in G^l} P_{lr}(x^k|\omega, \psi)}$$

$$\sigma^l = 2\gamma_d(\epsilon) \frac{\sum_{k \in G^l} P_{lr}(x^k|\omega, \psi)(x^k - \mu^l)(x^k - \mu^l)^t}{\sum_{k \in G^l} P_{lr}(x^k|\omega, \psi)}$$

where $$G^l := \{x^r : Q(x^r|\mu^l, \sigma^l) \le \epsilon\}.$$

In this formula we set h'(t)=0,0≤t≤ϵ, and h'(t)=1,t>ϵ.

GAUSSIAN DENSITY WITH DOUBLE EXPONENTIAL TAIL $$\mu^l = \frac{\sum_{k \in G^l} P_{lr}(x^k|\omega, \psi)x^k + \sum_{k \notin G^l} P_{lr}(x^k|\omega, \psi) \frac{1}{2}\sqrt{\epsilon} \left(\sum_{s=1}^{d} \sigma_s^{-1}(x_s^k - \mu_s^l)^2\right)^{-\frac{1}{2}}}{\sum_{k \in G^l} P_{lr}(x^k|\omega, \psi)}$$

$$\sigma^l = 2\gamma_d(\epsilon) \frac{\sum_{k \in G^l} P_{lr}(x^k|\omega, \psi)(x^k - \mu^l)(x^k - \mu^l)^t}{\sum_{k \in G^l} P_{lr}(x^k|\omega, \psi)}.$$

NUMERICAL EXPERIMENT

The density estimation schemes described here were used to classify acoustic vectors with the objective of using the maximum likelihood classification scheme in automatic recognition of continuous speech. In this section we report only on our numerical experience with mixture models having spherical α densities as mixture components. We then iterate with this initialization a variant of the EM algorithm corresponding to m=1 as described above.

Figure 11:
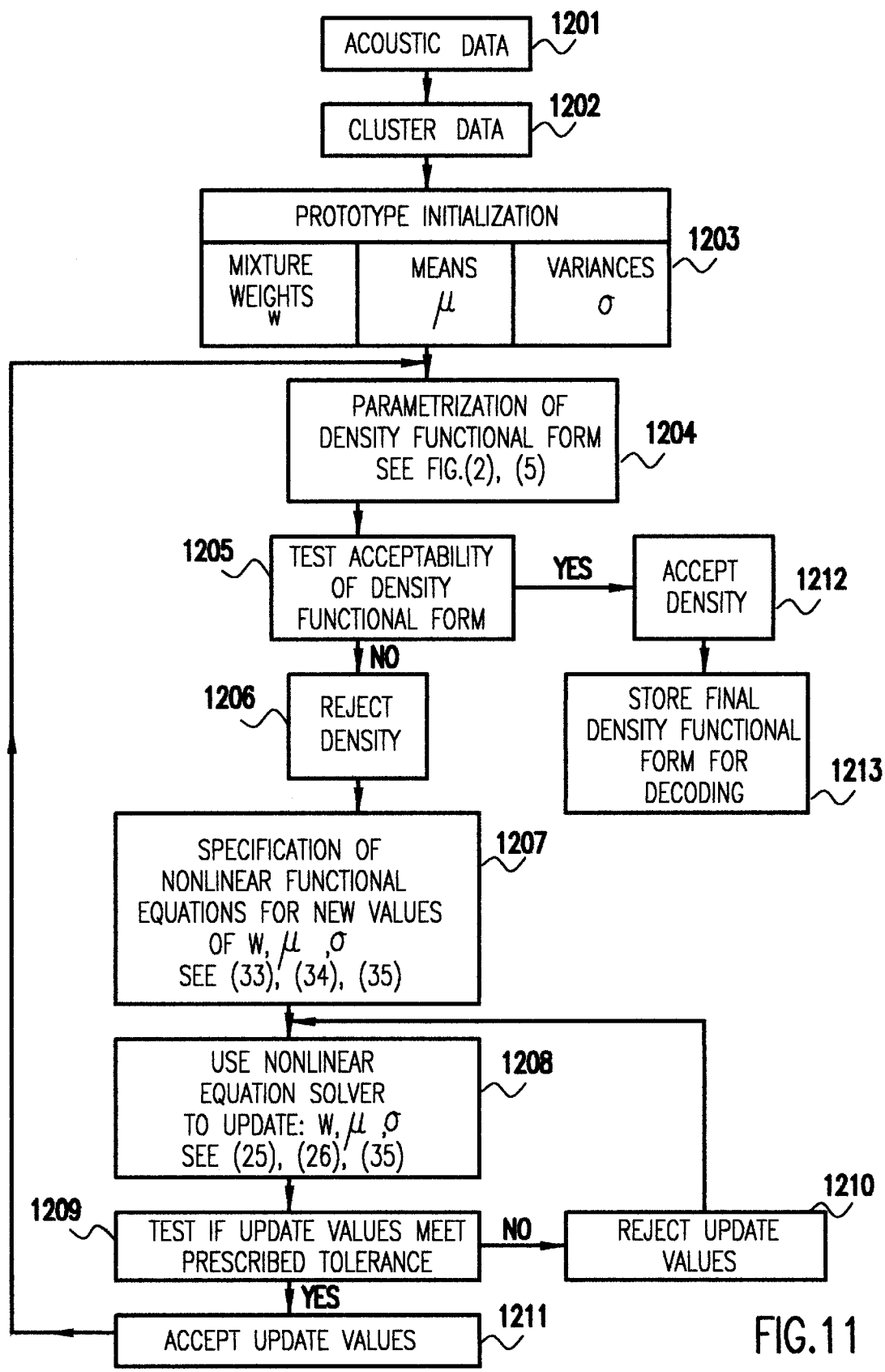
FIG. 11 is a flow diagram illustrating a computer implementation of the process according to the invention.

The invention was implemented on an IBM RS/6000 workstation running the AIX operating system (IBM's version of UNIX); however, the invention may be implemented on a variety of hardware platforms including personal computers (PCs), such as IBM's PS/2 PCs, mini computers, such as IBM's AS/400 computers, or main frame computers, such as IBM's ES/9000 computers. FIG. 11 is a flow diagram illustrating the logic of the implementation. The process starts with the input of acoustic data at input block 1201. The input acoustic data is clustered in function block 1202 prior to prototype initialization in function block 1203. At this point, the process enters a loop beginning with function block 1204 in parametrization of density function form using, for example, equations (2) and (5). As test is made in decision block 1205 to determine the acceptability of the density functional form. If the test is negative, the density is rejected in function block 1206, and then in function block 1207, the specification of nonlinear functional equations for new values of weights, means and variances is made. A test is made in decision block 1208 to determine if the update values meet prescribed tolerance. If not, the update values are rejected in function block 1209, and the process loops back to function block 1206; otherwise, the update values are accepted in function block 1210. At this point, the process loops back to function block 1204 for the next iteration. When the test in decision block 1205 is positive, the density is accepted in function block 1211, and the final density functional form is stored for decoding in function block 1212.

DESCRIPTION OF THE SPEECH DATA

The density estimation scheme described here was used to classify acoustic vectors associated with speech waveforms with the objective of incorporating the rest is into a large vocabulary automatic continuous speech recognizer. Digitized speech sampled at a rate of 16 KHz was considered. The training corpus of speech data consisted of the 35 hours of *Wall Street Journal* read speech consisting of 284 speakers. A frame consists of a segment of speech of duration 25 msec, and produces a 39 dimensional acoustic cepstral vector via the following process, which is standard in speech recognition literature. Alternative schemes are also used for speech recognition, but we do not use them in the present example. Frames are advanced every 10 msec to obtain succeeding acoustic vectors.

First, magnitudes of discrete Fourier transform of samples of speech data in a frame are considered in a logarithmically warped frequency scale. Next, these amplitude values themselves are transformed to a logarithmic scale, and subsequently, a rotation in the form of discrete cosine transform is applied. The latter two steps are motivated by logarithmic sensitivity of human hearing to frequency and amplitude. The first 13 components of the resulting vector are retained. The differences between the corresponding components of this 13 dimensional vector and the vector preceding it, as well the vector succeeding, it, are then appended to itself to obtain the 39 dimensional cesptral acoustic vector.

As in supervised learning tasks, we assume that these vectors are labeled according to the basic sounds they correspond to. In fact, the set of 46 phonemes or phones are subdivided into a set of 126 different variants. They are further subdivided into more elemental sounds or allophones by using the method of decision trees depending on the context in which they occur, (see, for example, Frederick Jelenik, *Statistical Methods for Speech Recognition,* MIT Press, 1997, L. R. Bahl, P. V. Desouza, P. S. Gopalkrishnan, and M. A. Picheny, "Context dependent vector quantization for continuous speech recognition", *Proceedings of IEEE Int. Conf. on Acoustics Speech and Signal Processing,* pp. 632–635, 1993, and Leo Breiman, *Classification and Regression Trees,* Wadsworth International, Belmont, Calif., 1983, for more details). The resulting tree, in our experiment, had a total of approximately 3500 leaves, which determine the class labels of the acoustic vectors mentioned above.

INITIALIZATION

For all the models we consider here, the variant of the EM algorithm we use are initialized in the following manner. The vectors corresponding to a given leaf are grouped into m groups according to the way they are labeled. There is no effort to cluster them as a means to enhance performance. In each group, we find the maximum likelihood estimator for the mixture component densities being used. This is done by using the same variant of the EM iteration we use; i.e., for the whole set of vectors, we set m=1 in this iteration. The maximum likelihood iteration is always initialized independent of the component densities being used at the mean and variance of the vectors for the group whose maximum likelihood estimator we are trying to find.

CLASSIFICATION EXPERIMENT

The density estimation schemes were first tested by using all the vectors corresponding to a certain phone, labeled say $AA_1$ consisting of a total of approximately 41,000 vectors each of 13 dimensions. The decision tree generates a set of 15 leaves for this phone. The parameters $\mu$, $\Sigma$, and the mixture weights ω corresponding to each of these classes (i.e., the leaves) are obtained by using the proposed density estimation scheme for a given value of α. The effectiveness of proposed scheme was first tested by computing the percentage of correctly classified vectors based on the estimated probability densities for the classes (leaves in our case). A vector was assigned to a class if the likelihood for the vector computed from the estimated probability densities was the largest. A subset of 1000 vectors from each leaf that were used for estimating the probability densities, were also used for this purpose. The percentage of correctly classified vectors for different values of a are shown in Table 1 in the case of spherical α-densities.

TABLE 1

| Leaf No. | α = 0.5 | α = 1.0 | α = 2.0 | α = 3.0 | α4.0 |
|---|---|---|---|---|---|
| 0 | 928 | 932 | 936 | 935 | 919 |
| 1 | 738 | 748 | 765 | 732 | 742 |
| 2 | 886 | 892 | 898 | 874 | 865 |
| 3 | 887 | 898 | 882 | 880 | 871 |
| 4 | 872 | 891 | 902 | 894 | 897 |
| 5 | 671 | 680 | 698 | 711 | 689 |
| 6 | 857 | 863 | 870 | 871 | 862 |
| 7 | 763 | 759 | 741 | 727 | 714 |
| 8 | 734 | 745 | 741 | 727 | 714 |
| 9 | 839 | 839 | 836 | 843 | 823 |
| 10 | 789 | 800 | 792 | 777 | 776 |
| 11 | 837 | 851 | 876 | 861 | 855 |
| 12 | 422 | 437 | 476 | 458 | 442 |
| 13 | 816 | 806 | 817 | 812 | 792 |
| 14 | 689 | 673 | 669 | 670 | 671 |
| % Overall | 78.19 | 78.76 | 79.33 | 78.65 | 77.80 |

Similar experiments were also used to investigate the behavior of our EM-type iterative scheme for estimating parameter vectors describing densities. For this purpose, the percentage of correctly classified vectors for each leaf is tabulated in Table 2 as a function of number of iterations for gaussian mixture components.

TABLE 2

| Leaf No. | Iter. 5 | Iter. 10 | Iter. 20 | Iter. 40 | Iter. 80 |
|---|---|---|---|---|---|
| 0 | 936 | 940 | 947 | 947 | 943 |
| 1 | 765 | 768 | 792 | 800 | 796 |
| 2 | 898 | 919 | 906 | 907 | 908 |
| 3 | 882 | 877 | 894 | 906 | 908 |
| 4 | 902 | 888 | 902 | 902 | 904 |
| 5 | 698 | 722 | 734 | 744 | 738 |
| 6 | 870 | 872 | 875 | 881 | 892 |
| 7 | 741 | 760 | 756 | 771 | 772 |
| 8 | 741 | 730 | 740 | 743 | 745 |
| 9 | 836 | 835 | 834 | 848 | 843 |
| 10 | 792 | 810 | 810 | 799 | 791 |
| 11 | 876 | 893 | 881 | 881 | 882 |
| 12 | 476 | 513 | 523 | 535 | 538 |
| 13 | 817 | 827 | 846 | 845 | 858 |
| 14 | 669 | 682 | 703 | 709 | 704 |
| % Overall | 79.3 | 80.2 | 81.0 | 81.5 | 81.5 |

SPEECH RECOGNITION EXPERIMENT

Figure 10:
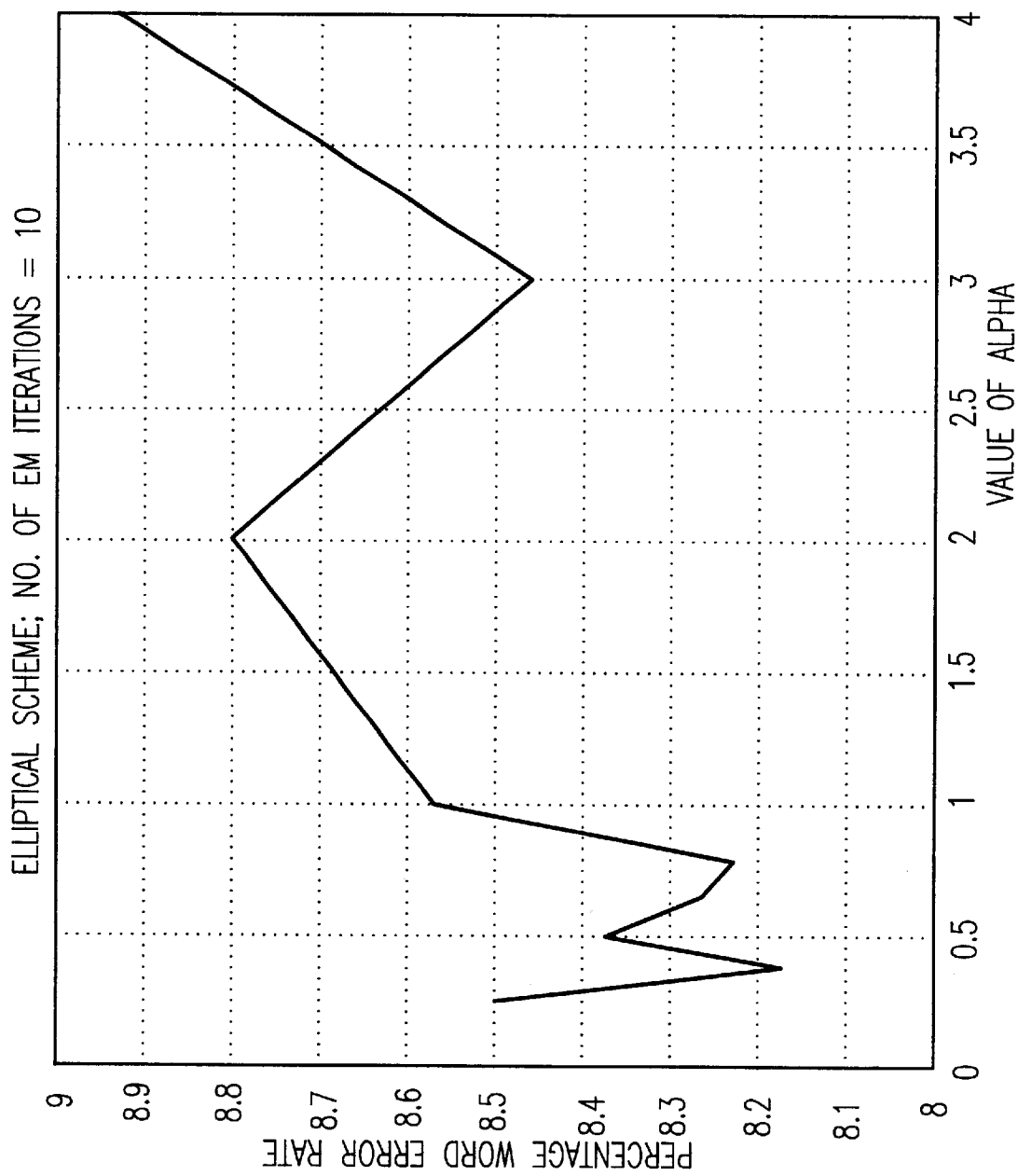
FIG. 10 is a graph showing percent word error for different values of $\alpha$.

Similar experiments were performed on the entire Wall Street Journal data base. Here, the entire set of (approximately 3500) leaves were each modeled by a mixture of nongaussian densities by estimating the ωs, $\mu$s and $\Sigma$s associated with them. The system was tested on acoustic vectors collected from a set of 10 test speakers, each uttering 42 sentences. For every test vector presented, a likelihood rank was assigned to each of the 3500 leaves, which can be interpreted as probability of that elemental sound. The IBM speech decoder used the ranks of these leaves to produce the decoded word string. The percentage word error rates are tabulated in Table 3 for a range of values of α, and are graphically shown in FIG. 10.

TABLE 3

| value of α | 0.25 | 0.375 | 0.50 | 0.75 | 1.00 | 2.00 | 3.00 | 4.00 |
|---|---|---|---|---|---|---|---|---|
| % word error | 8.50 | 8.18 | 8.38 | 8.24 | 8.56 | 8.80 | 8.47 | 8.92 |

The fact that a value of a less than 2 (i.e., a nongaussian density) provides fewer recognition errors is clear from this plot. In fact, relative improvements of about 7% from the gaussian is obtained.

The experiment demonstrates the value of nongaussian models for mixture model density estimation of acoustics feature vectors used in speech recognition. This suggests the potential for improved recognition accuracy when nongaussian parametric models are used.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented process for automatic machine recognition of speech comprising the steps of:

inputting acoustic data;

modeling input acoustic data using mixtures of nongaussian statistical probability densities constructed from a univariate function;

using a maximum likelihood model of speech data, iteratively generating values of mixture weights, means and variances until an acceptable density is found; and storing a final density function form for decoding.

2. The computer implemented process for automatic machine recognition of speech recited in claim 1 wherein the mixtures of nongaussian statistical probability densities of exponential type exp(-h(t)).

3. The computer implemented process for automatic machine recognition of speech recited in claim 2 wherein $h(t)=t^{\alpha/2}$, where α is a non-negative real number.

4. The computer implemented process for automatic machine recognition of speech recited in claim 1 wherein multivariate densities are used.

5. The computer implemented process for automatic machine recognition of speech recited in claim 4 wherein the multivariate densities are a tensor product construction.

6. The computer implemented process for automatic machine recognition of speech recited in claim 4 wherein the multivariate densities are a spherical construction.

7. The computer implemented process for automatic machine recognition of speech recited in claim 4 wherein the multivariate densities are a clipped Gaussian density.

8. The computer implemented process for automatic machine recognition of speech recited in claim 4 wherein the multivariate densities are a Gaussian density with a double exponential tail.

* * * * *